US010350837B2

(12) United States Patent
Wardle et al.

(10) Patent No.: US 10,350,837 B2
(45) Date of Patent: Jul. 16, 2019

(54) COMPOSITE ARTICLES COMPRISING NON-LINEAR ELONGATED NANOSTRUCTURES AND ASSOCIATED METHODS

(71) Applicants: Massachusetts Institute of Technology, Cambridge, MA (US); Saab AB, Linköping (SE)

(72) Inventors: Brian L. Wardle, Lexington, MA (US); Pontus Nordin, Linköping (SE)

(73) Assignees: Massachusetts Institute of Technology, Cambridge, MA (US); Saab AB, Linkoping (SE)

( * ) Notice: Subject to any disclaimer, the term of this patent is extended or adjusted under 35 U.S.C. 154(b) by 6 days.

(21) Appl. No.: 15/609,557

(22) Filed: May 31, 2017

(65) Prior Publication Data

US 2017/0341316 A1   Nov. 30, 2017

Related U.S. Application Data

(60) Provisional application No. 62/343,604, filed on May 31, 2016.

(51) Int. Cl.

| | |
|---|---|
| *B29C 70/42* | (2006.01) |
| *C01B 32/162* | (2017.01) |
| *B29C 53/02* | (2006.01) |
| *C08J 5/00* | (2006.01) |
| *C08J 7/06* | (2006.01) |

(Continued)

(52) U.S. Cl.
CPC ............. *B29C 70/42* (2013.01); *B29C 53/02* (2013.01); *B29C 70/081* (2013.01); *B29C 70/14* (2013.01); *C01B 32/162* (2017.08); *C08J 5/005* (2013.01); *C08J 7/06* (2013.01); *B29K 2105/167* (2013.01); *B29K 2307/04* (2013.01); *B82Y 30/00* (2013.01); *B82Y 40/00* (2013.01); *C01B 2202/08* (2013.01); *C08J 2363/00* (2013.01); *Y10S 977/742* (2013.01); *Y10S 977/753* (2013.01); *Y10S 977/843* (2013.01)

(58) Field of Classification Search
CPC ...................................................... B29C 70/42
USPC ......................................................... 428/121
See application file for complete search history.

(56) References Cited

U.S. PATENT DOCUMENTS

| | | | |
|---|---|---|---|
| 3,580,731 A | 5/1971 | Milewski et al. | |
| 4,560,603 A | 12/1985 | Giacomel | |

(Continued)

FOREIGN PATENT DOCUMENTS

| | | |
|---|---|---|
| CN | 102263221 A | 11/2011 |
| EP | 1 489 630 A1 | 12/2004 |

(Continued)

OTHER PUBLICATIONS

U.S. Appl. No. 60/417,959, filed Oct. 11, 2002, Kim.

(Continued)

*Primary Examiner* — Brent T O'Hern
(74) *Attorney, Agent, or Firm* — Wolf, Greenfield & Sacks, P.C.

(57) ABSTRACT

The present disclosure relates to composite articles comprising non-linear elongated nanostructures and associated systems and methods. In certain embodiments, collections of carbon nanotubes or other elongated nanostructures can be used to provide mechanical reinforcement along multiple directions within a composite article.

12 Claims, 19 Drawing Sheets

Perspective View

(51) Int. Cl.
*B29C 70/08* (2006.01)
*B29C 70/14* (2006.01)
*B29K 105/16* (2006.01)
*B29K 307/04* (2006.01)
*B82Y 30/00* (2011.01)
*B82Y 40/00* (2011.01)

(56) References Cited

U.S. PATENT DOCUMENTS

| | | |
|---|---|---|
| 4,718,971 A | 1/1988 | Summers |
| 4,770,926 A | 9/1988 | Yamamura et al. |
| 4,892,693 A | 1/1990 | Perrotta et al. |
| 5,149,584 A | 9/1992 | Baker et al. |
| 5,540,126 A | 7/1996 | Piramoon |
| 5,580,502 A | 12/1996 | Forster et al. |
| 5,648,109 A | 7/1997 | Gutowski et al. |
| 5,847,283 A | 12/1998 | Finot et al. |
| 5,954,917 A | 9/1999 | Jackson et al. |
| 6,155,514 A | 12/2000 | Hailey et al. |
| 6,265,333 B1 | 7/2001 | Dzenis et al. |
| 6,420,293 B1 | 7/2002 | Chang et al. |
| 6,495,258 B1 | 12/2002 | Chen et al. |
| 7,060,241 B2 | 6/2006 | Glatkowski |
| 7,132,161 B2 | 11/2006 | Knowles et al. |
| 7,160,531 B1 | 1/2007 | Jacques et al. |
| 7,323,157 B2 | 1/2008 | Kinloch et al. |
| 7,537,825 B1 | 5/2009 | Wardle et al. |
| 7,727,624 B2 | 6/2010 | Cao et al. |
| 7,884,525 B2 | 2/2011 | Culpepper et al. |
| 8,130,007 B2 | 3/2012 | Eldridge et al. |
| 8,337,979 B2 | 12/2012 | Wardle et al. |
| 8,388,795 B2 | 3/2013 | Tsotsis |
| 8,638,113 B2 | 1/2014 | Crafts et al. |
| 8,987,707 B2 | 3/2015 | Arnold et al. |
| 9,181,639 B2 | 11/2015 | Hart et al. |
| 9,394,175 B2 | 7/2016 | Hart et al. |
| 9,478,610 B2 | 10/2016 | Hart et al. |
| 10,195,797 B2 | 2/2019 | Williams et al. |
| 2003/0012721 A1 | 1/2003 | Nakayama et al. |
| 2003/0096104 A1 | 5/2003 | Tobita et al. |
| 2003/0143453 A1 | 7/2003 | Ren et al. |
| 2003/0231471 A1 | 12/2003 | De Lorenzo et al. |
| 2003/0236588 A1 | 12/2003 | Jang et al. |
| 2004/0071870 A1 | 4/2004 | Knowles et al. |
| 2004/0097635 A1 | 5/2004 | Fan et al. |
| 2004/0099438 A1 | 5/2004 | Arthur et al. |
| 2004/0105807 A1 | 6/2004 | Fan et al. |
| 2004/0235376 A1 | 11/2004 | Byma et al. |
| 2004/0250950 A1 | 12/2004 | Dubrow |
| 2005/0064185 A1 | 3/2005 | Buretea et al. |
| 2005/0066883 A1 | 3/2005 | Dubrow et al. |
| 2005/0081983 A1 | 4/2005 | Nakayama et al. |
| 2005/0116336 A1 | 6/2005 | Chopra et al. |
| 2005/0130341 A1 | 6/2005 | Furukawa et al. |
| 2005/0152826 A1 | 7/2005 | Shatwell |
| 2005/0167647 A1 | 8/2005 | Huang et al. |
| 2005/0170089 A1 | 8/2005 | Lashmore et al. |
| 2005/0176329 A1 | 8/2005 | Olry et al. |
| 2005/0215049 A1 | 9/2005 | Horibe et al. |
| 2005/0224220 A1 | 10/2005 | Li et al. |
| 2006/0018018 A1 | 1/2006 | Nomura et al. |
| 2006/0062944 A1 | 3/2006 | Gardner et al. |
| 2006/0073089 A1 | 4/2006 | Ajayan et al. |
| 2006/0166003 A1 | 7/2006 | Khabashesku et al. |
| 2006/0231970 A1* | 10/2006 | Huang ............... B81C 1/0069 264/134 |
| 2006/0240238 A1 | 10/2006 | Boussard et al. |
| 2006/0252853 A1 | 11/2006 | Ajayan et al. |
| 2006/0260751 A1 | 11/2006 | Lauder et al. |
| 2006/0270790 A1 | 11/2006 | Comeau |
| 2007/0004081 A1 | 1/2007 | Hsiao |
| 2007/0090489 A1 | 4/2007 | Hart et al. |
| 2007/0092431 A1 | 4/2007 | Resasco et al. |
| 2007/0128960 A1 | 6/2007 | Nejhad et al. |
| 2007/0190880 A1 | 8/2007 | Dubrow et al. |
| 2007/0244245 A1 | 10/2007 | Liu et al. |
| 2008/0018012 A1 | 1/2008 | Lemaire et al. |
| 2008/0075954 A1 | 3/2008 | Wardle et al. |
| 2008/0086564 A1 | 4/2008 | Putman et al. |
| 2008/0170982 A1 | 7/2008 | Zhang et al. |
| 2008/0187648 A1 | 8/2008 | Hart et al. |
| 2008/0280137 A1 | 11/2008 | Ajayan et al. |
| 2008/0286564 A1 | 11/2008 | Tsotsis |
| 2009/0075157 A1 | 3/2009 | Pak et al. |
| 2009/0117363 A1 | 5/2009 | Wardle et al. |
| 2009/0266477 A1 | 10/2009 | Weisenberger et al. |
| 2009/0311166 A1 | 12/2009 | Hart et al. |
| 2010/0192851 A1 | 8/2010 | Shah et al. |
| 2010/0196695 A1 | 8/2010 | Garcia et al. |
| 2010/0255303 A1 | 10/2010 | Wardle et al. |
| 2010/0276072 A1 | 11/2010 | Shah et al. |
| 2010/0279569 A1 | 11/2010 | Shah et al. |
| 2011/0133135 A1 | 6/2011 | Maeno et al. |
| 2011/0159270 A9 | 6/2011 | Davis et al. |
| 2012/0015098 A1 | 1/2012 | Cheng et al. |
| 2012/0088056 A1 | 4/2012 | Hallander et al. |
| 2012/0164903 A1 | 6/2012 | Wardle et al. |
| 2012/0251432 A1 | 10/2012 | Cooper et al. |
| 2012/0282453 A1 | 11/2012 | Wang et al. |
| 2013/0029089 A1 | 1/2013 | Kia |
| 2013/0142987 A1 | 6/2013 | Wardle et al. |
| 2014/0127490 A1 | 5/2014 | Islam et al. |
| 2014/0154412 A1 | 6/2014 | Malecki et al. |
| 2014/0186547 A1 | 7/2014 | Wu et al. |
| 2014/0295166 A1 | 10/2014 | Steiner, III et al. |
| 2015/0000960 A1 | 1/2015 | Gaynor et al. |
| 2015/0037517 A1 | 2/2015 | Buriak et al. |
| 2015/0053927 A1 | 2/2015 | Arnold et al. |
| 2015/0360424 A1 | 12/2015 | Williams et al. |
| 2016/0083256 A1 | 3/2016 | Hart et al. |
| 2016/0340482 A1 | 11/2016 | Williams et al. |
| 2017/0057823 A1 | 3/2017 | Hart et al. |
| 2017/0110215 A1 | 4/2017 | Wright et al. |

FOREIGN PATENT DOCUMENTS

| | | |
|---|---|---|
| EP | 1 637 828 A2 | 3/2006 |
| EP | 1 652 573 A1 | 5/2006 |
| EP | 2330077 A1 | 6/2011 |
| FR | 2865739 A1 | 8/2005 |
| JP | S50-119071 A | 9/1975 |
| JP | 63-93374 A | 4/1988 |
| JP | 63-97257 A | 4/1988 |
| JP | 2-17964 A | 1/1990 |
| JP | 2-147270 U | 12/1990 |
| JP | 2000-172202 A | 6/2000 |
| JP | 2001-080912 A | 3/2001 |
| JP | 2001-291465 A | 10/2001 |
| JP | 2002-141633 A | 5/2002 |
| JP | 2002-206169 A | 7/2002 |
| JP | 2002-293518 A | 10/2002 |
| JP | 2003-500325 A | 1/2003 |
| JP | 2003-119295 A | 4/2003 |
| JP | 2003-249166 A | 9/2003 |
| JP | 2003-286017 A | 10/2003 |
| JP | 2004-030926 A | 1/2004 |
| JP | 2004-55158 A | 2/2004 |
| JP | 2004-268192 A | 9/2004 |
| JP | 2005-007861 A | 1/2005 |
| JP | 2005-22141 | 1/2005 |
| JP | 2005-068000 A | 3/2005 |
| JP | 2005-078880 A | 3/2005 |
| JP | 2005-170787 A | 6/2005 |
| JP | 2005-200675 A | 7/2005 |
| JP | 2005-256222 A | 9/2005 |
| JP | 2005-285821 A | 10/2005 |
| JP | 2005-302305 A | 10/2005 |
| JP | 2005-538026 A | 12/2005 |
| JP | 2006-008473 A | 1/2006 |
| JP | 2006-011296 A | 1/2006 |
| JP | 2006-095429 A | 4/2006 |
| JP | 2006-206169 A | 8/2006 |
| JP | 2006-228818 A | 8/2006 |
| JP | 2006-295120 A | 10/2006 |

(56) References Cited

FOREIGN PATENT DOCUMENTS

| | | |
|---|---|---|
| JP | 2007-515364 A | 6/2007 |
| JP | 2007-523033 A | 8/2007 |
| JP | 2008-044099 A | 2/2008 |
| JP | 2009-517531 A | 4/2009 |
| JP | 2009-537339 A | 10/2009 |
| JP | 2009-537439 A | 10/2009 |
| JP | 2010-027251 A | 2/2010 |
| JP | 2010-257975 A | 11/2010 |
| JP | 4883841 B2 | 2/2012 |
| JP | 2012-87016 A | 5/2012 |
| JP | 2012-510426 A | 5/2012 |
| WO | WO 01/94260 A1 | 12/2001 |
| WO | WO 03/049219 A1 | 6/2003 |
| WO | WO 03/069019 A1 | 8/2003 |
| WO | WO 03/093174 A1 | 11/2003 |
| WO | WO 2004/094303 A2 | 11/2004 |
| WO | WO 2005/028549 A2 | 3/2005 |
| WO | WO 2005/044723 A2 | 5/2005 |
| WO | WO 2005/075341 A2 | 8/2005 |
| WO | WO 2006/120803 A1 | 11/2006 |
| WO | WO 2006/135375 A2 | 12/2006 |
| WO | WO 2007/055744 A2 | 5/2007 |
| WO | WO 2007/116706 A1 | 10/2007 |
| WO | WO 2007/136755 A2 | 11/2007 |
| WO | WO 2008/054409 A2 | 5/2008 |
| WO | WO 2008/054541 A2 | 5/2008 |
| WO | WO 2008/103221 A1 | 8/2008 |
| WO | WO 2009/029218 A2 | 3/2009 |
| WO | WO 2011/106109 A2 | 9/2011 |
| WO | WO 2012/074367 A1 | 6/2012 |
| WO | WO 2014/197078 A2 | 12/2014 |
| WO | WO 2015/199785 A2 | 12/2015 |

OTHER PUBLICATIONS

U.S. Appl. No. 60/740,461, filed Nov. 28, 2005, Nejhad et al.
[No Author Listed] Buckypaper systems for treatment of acute wounds. NanoTech Briefs. 2005, 2 pages.
Barber et al., Measurement of carbon nanotube-polymer interfacial strength. Applied Physics Letters. Jun. 9, 2003;82(23): 4140-2.
Bauhofer et al., A review and analysis of electrical percolation in carbon nanotube polymer composites. Compos Sci Technol. 2009;69:1486-98. doi:10.1016/j.compscitech.2008.06.018, 13 pages. Epub Jun. 25, 2008.
Bennett et al., Controlling the morphology of carbon nanotube films by varying the areal density of catalyst nanoclusters using block copolymer micellar thin films. Advanced Materials. Sep. 2006; 18(17): 2274-9.
Bennett et al., Creating patterned carbon nanotube catalysts through the microcontact printing of block copolymer micellar thin films. Langmuir. Sep. 26, 2006;22(20):8273-6.
Bennett et al., Using block copolymer micellar thin films as templates for the production of catalysts for carbon nanotube growth. Chemistry of Materials. Nov. 25, 2004; 16(26): 5589-98. DOI: 10.1021/cm0489921.
Blanco et al., Limiting mechanisms of Mode 1 interlaminar toughening of composites reinforced with aligned carbon nanotubes. J. Composite Mater. Apr. 2009; 43(8):825-41. doi: 10.1177/0021998309102398.
Boskovic et al., Low temperature synthesis of carbon nanofibres on carbon fibre matrices. carbon. Nov. 2005;43(13): 2643-8. doi:10.1016/j.carbon.2005.04.034.
Bradshaw et al., Fiber waviness in nanotube-reinforced polymer composites—II: modeling via numerical approximation of the dilute strain concentration tensor. Comp Sci Technol. 2003;63:1705-22.
Breuer et al., Big returns from small fibers: a review of polymer/carbon nanotube composites. Polymer Composites. Dec. 2004; 25(6), 630-45. DOI: 10.1002/pc.20058.
Cao et al., Multifunctional brushes made from carbon nanotubes. Nat Mater. Jul. 2005;4(7):540-5. Epub Jun. 12, 2005.
Ci et al., Direct growth of carbon nanotubes on the surface of ceramic fibers. Carbon. Jan. 2005;43(4): 883-6. doi:10.1016/j.carbon.2004.11.010.
Coleman et al., High-performance nanotube-reinforced plastics: understanding the mechanism of strength increase. Advanced Functional Materials. Aug. 2004; 14(8): 791-8. doi: 10.1002/adfm.200305200.
Coleman et al., Improving the mechanical properties of single-walled carbon nanotube sheets by intercalation of polymeric adhesives. Applied Physics Letters. Mar. 17, 2003; 82(11): 1682-4.
Coleman et al., Small but strong: A review of the mechanical properties of carbon nanotube-polymer composites. Carbon. Aug. 2006; 44(9): 1624-1652. doi:10.1016/j.carbon.2006.02.038.
Cooper et al., Detachment of nanotubes from a polymer matrix. applied physics letter. Nov. 11, 2002; 81(20): 3873-5.
Du et al., Effect of nanotube alignment on percolation conductivity in carbon nanotube/polymer composites. Physical Review B. Sep. 2005; 72(12): 121404-1. doi: 10.1103/PhysRevB.72.121404.
Endo et al., Atomic nanotube welders: boron interstitials triggering connections in double-walled carbon nanotubes. Nano Lett. Jun. 2005;5(6):1099-105.
Fan et al., Carbon nanotube arrays on silicon substrates and their possible application. Physica E. Aug. 2000;8(2):179-83.
Fan et al., Self-oriented regular arrays of carbon nanotubes and their field emission properties. Science. Jan. 22, 2009; 283(5401): 512-514.
Garcia et al., (Student Paper) Fabrication and testing of long carbon nanotubes grown on the surface of fibers for hybrid composites. Presented at the 47th AIAA/ASME/ASCE/AJS/ASC Structures, Structural Dynamics, and Materials Conference, Newport, R.I., May 14, 2006, 11 pages.
Hart et al., Desktop growth of carbon-nanotube monoliths with in situ optical imaging. Small. May 2007;3(5):772-7.
Hart et al., Force output, control of film structure, and microscale shape transfer by carbon nanotube growth under mechanical pressure. Nano Lett. Jun. 2006;6(6):1254-60.
Hart et al., Growth of conformal single-walled carbon nanotube films from Mo/Fe/Al2O3 deposited by electron beam evaporation. Carbon. Feb. 2006; 44(2): 348-59.
Hart et al., Rapid growth and flow-mediated nucleation of millimeter-scale aligned carbon nanotube structures from a thin-film catalyst. J Phys Chem B. Apr. 27, 2006;110(16):8250-7.
Hart et al., Versatility of the Fe/$Al_2O_3$ system for high-yield carbon nanotube growth by thermal CVD of $C_2H_4$. NT05: Sixth International Conference on the Science and Application of Nanotubes; Göteborg University, Chalmers University of Technology, and University College of Borås; (Gothenburg, Sweden); Jun. 26-Jul. 1, 2005. Abstract, 1 page.
Hart et al., Versatility of the Fe/Al2O3 system for high-yield carbon nanotube growth by thermal CVD of C2H4. NT05: Sixth International Conference on the Science and Application of Nanotubes; Göteborg University, Chalmers University of Technology, and University College of Borås; (Gothenburg, Sweden); Jun. 26-Jul. 1, 2005. Poster, 1 page.
Hart, A.J., "Chemical, mechanical, and thermal control of substrate-bound carbon nanotube growth." Doctoral Thesis, Department of Mechanical Engineering, Published Jan. 23, 2007; Submitted Aug. 19, 2006, 357 pages.
Huh et al., Control of carbon nanotube growth using cobalt nanoparticles as catalyst. Applied Surface Science.Elsevier. Aug. 2005; 249(1-4):145-50. DOI: 10.1016/j.apsusc.2004.11.059.
Kis et al., Reinforcement of single-walled carbon nanotube bundles by intertube bridging. Nat Mater. Mar. 2004;3(3):153-7. Epub Feb. 15, 2004.
Koratkar et al., Multifunctional structural reinforcement featuring carbon nanotube films. Composites Science and Technology. Jul. 2003; 63: 1525-31. doi:10.1016/S0266-3538(03)00065-4.
Krasheninnikov et al., Ion-irradiation-induced welding of carbon nanotubes. Physical Review B.Dec. 2002; 66(24):245403-1-6. doi: 10.1103/PhysRevB.66.245403.
Krasheninnikov et al., Irradiation effects in carbon nanotubes. Nuclear Instruments and Methods in Physics Research B. Feb. 2004;216:355-66.

(56) References Cited

OTHER PUBLICATIONS

Kwok et al., Continuous deposition of carbon nanotubes on a moving substrate by open-air laser-induced chemical vapor deposition. Carbon. Oct. 2005; 43(12): 2571-8.
Merchan-Merchan et al., High flame synthesis of vertically aligned carbon nanotubes using electric field control. Carbon.2004:42:599-608.
Motamedi et al., Effect of straight and wavy carbon nanotube on the reinforcement modulus in nonlinear elastic matrix nanocomposites. Mater and Design. Feb. 2012;34:603-8.
Natarajan et al., The evolution of carbon nanotube network structure in unidirectional nanocomposites resolved by quantitative electron tomography, with Supplemental Information. ACS Nano. 2015;9(6):6050-8. doi: 10.1021/acsnano.5b01044, Epub Jun. 1, 2015, 20 pages.
Ray et al., Load transfer analysis in short carbon fibers with radially-aligned carbon nanotubes embedded in a polymer matrix. J. Adv. Mater. Oct. 2009;41(4):82-94.
Sandler et al., Ultra-low electrical percolation threshold in carbon-nanotube-epoxy composites. Polymer. Sep. 2003; 44(19): 5893-9.
Stein et al., Aligned carbon nanotube array stiffness from stochastic three-dimensional morphology. Nanoscale. 2015;7:19426-31.
Terrones et al., Controlled production of aligned-nanotube bundles. Nature. Jul. 3, 1997; 388(6637): 52-5.
Thostenson et al., Advances in the science and technology of carbon nanotubes and their composites: A Review. Composites Science and Technology.Oct. 2001; 61(13):1899-1912.
Thostenson et al., Carbon nanotube/carbon fiber hybrid multiscale composites. Journal of Applied Physics. Apr. 2002;91(9): 6034-7.
Thostenson et al., Nanocomposites in context. Composites Science and Technology. Mar. 2005; 65(3-4):491-516. doi:10.1016/j.compscitech.2004.11.003.
Veedu et al., Multifunctional composites using reinforced laminae with carbon-nanotube forests. Nature Materials. Jun. 2006; 5:457-62.
Wagner et al., Nanotube-polymer adhesion: a mechanics approach. Chemical Physics Letters. Jul. 24, 2002; 361(1-2):57-61.
Wardle et al., Fabrication and characterization of ultrahigh-volume-fraction aligned carbon nanotube-polymer composites. Adv Mater. 2008;20:2707-14.
Yaglioglu et al., Wide range control of microstructure and mechanical properties of carbon nanotube forests: a comparison between fixed and floating catalyst CVD techniques. Adv Funct Mater. 2012. doi:10/1002/adfm.201200852, 10 pages.
Zhao et al, A Bone mimic based on the self-assembly of hydroxyapatite on chemically functionalized single-walled carbon nanotubes. Chem. Mater. May 13, 2005; 17(12): 3235-41. doi: 10.1021/cm0500399.
Zhu et al., Direct synthesis of long single-walled carbon nanotube strands. Science. May 3, 2002; 296(5569): 884-6. XP-002273566. DOI:10.1126/SCIENCE.1066996.
Andrews et al., Continuous production of aligned carbon nanotubes: a step closer to commercial realization. Chem Phys Lett. Apr. 16, 1999;303(5-6):467-74.
Hong et al., Synthesis of carbon nanotubes using microwave radiation. Adv Funct Mater. Dec. 2003;13(12):961-6.
International Search Report and Written Opinion dated Aug. 9, 2017 for Application No. PCT/US2017/035094.
Kundalwal et al., Effective thermal conductivities of a novel fuzzy fiber-reinforced composite containing wavy carbon nanotubes. Journal of Heat Transfer. Jan. 2015;137:012401-1-012401-12.
International Preliminary Report on Patentability dated Dec. 13, 2018 for Application No. PCT/US2017/035094.
Ahn et al., Simultaneous measurements of permeability and capillary pressure of thermosetting matrices in woven fabric reinforcements. Polym. Compos. Jun. 1991.;12(3):146-52.
Ajayan et al.., Materials science-Nanotube composites. Nature. Jun. 28, 2007;447(7148):1066-8.
Amico et al., An experimental study of the permeability and capillary pressure in resin-transfer moulding. Compos. Sci. Technol. 2001;61(13):1945-59.

Aravand et al., Internal geometry of woven composite laminates with "fuzzy" carbon nanotube grafted fibers. Composites: Part A. 2016;88:295-304. Epub Jun. 16, 2016.
Bhattacharya, Polymer nanocomposites—A comparison between carbon nanotubes, graphene, and clay as nanofillers. Materials. 2016;9:262(1-35). Epub Apr. 1, 2016.
Boncel et al., Dynamics of capillary infiltration of liquids into a highly aligned multi-walled carbon nanotube film. Beilstein J. Nanotechnol. 2011;2:311-7. Epub Jun. 20, 2011.
Brunauer et al., Adsorption of gases in multimolecular layers. J Am Chem Soc. Feb. 1938; 60(2): 309-319.
Campbell, Polymer Matrix Composites. Ch. 7 in Manuf. Tech for Aerospace Structural Materials. 2006. Elsevier. pp. 273-368.
Cebeci et al., Multifunctional properties of high volume fraction aligned carbon nanotube polymer composites with controlled morphology. Compos. Sci. Technol. 2009;69:2649-56. Epub Aug. 19, 2006.
Cebeci et al., Processing of hybrid advanced composites utilizing capillarity-driven wetting of aligned carbon nanotubes. In 2008 SAMPE Fall Tech Conf and Exhibition—Multifunctional Materials: Working Smarter Together (SAMPE '08). Memphis, TN. Sep. 2008.
Chee et al., Nanocomposites of graphene/polymers: A review. RSC Adv. 2015;5:68014-51.
Cheng, Measurement of surface tension of epoxy resins used in dispensing process for manufacturing thin film transistor-liquid crystal displays. IEEE Transactions on Advanced Packaging. Feb. 2008; 31(1):100-6.
Chu, Mit News, Taking aircraft manufacturing out of the oven. Apr. 14, 2015; 3 pages. http://news.mit.edu/2015/carbon-nanotube-film-heats-composite-materials-0414 . . . .
Ergun et al., Fluid flow through randomly packed columns and fluidized beds. Industrial & Engineering Chemistry. 1949;41(6):1179-84.
Fan et al., Experimental investigation of dispersion during flow of multi-walled carbon nanotube/polymer suspension in fibrous porous media. Carbon. 2004;42(4):871-6.
Gao et al., In situ sensing of impact damage in epoxy/glass fiber composites using percolating carbon nanotube networks. Carbon. 2011;49(10):3382-5. Epub Apr. 9, 2011.
Garcia et al, Joining prepreg composite interfaces with aligned carbon nanotubes. Composites: Part A. 2008;39(6):1065-70.
Garcia et al., Fabrication of composite microstructures by capillarity-driven wetting of aligned carbon nanotubes with polymers. Nanotechnol. 2007; 18:165602(1-11). Epub Mar. 23, 2007.
Gibson, A review of recent research on mechanics of multifunctional composite materials and structures. Composite Structures 2010;92(12):2793-2810. Epub May 8, 2010.
Guzman de Villoria et al., Multi-physics damage sensing in nano-engineered structural composites. Nanotechnol. 2011;22(18):185502(1-7). Epub Mar. 22, 2011.
Harris. Carbon nanotube composites. International Materials Reviews. 2004;49(1):31-43.
Hsieh et al., The effect of carbon nanotubes on the fracture toughness and fatigue performance of a thermosetting epoxy polymer. J Mater Sci. 2011;46:7525-35.
Hubert et al., Autoclave processing for composites. Ch. 13 in Manufacturing Techniques for Polymer Matrix Composites (PMCs). Ed. by Advani et al., pp. 414-434. Woodhead Publishing Ltd.: Cambridge, England. 2012.
Ishiguro et al., Processing and characterization of infusion-processed hybrid composites with in situ grown aligned carbon nanotubes. 50th AIAA/ASME/ASCE/AHS/ASC Structures, Structural Dynamics, and Materials Conference. May 4-7, 2009. Palm Springs, CA. AIAA 2009-2541. 9 pages.
Kuentzer et al., Permeability characterization of dual scale fibrous porous media. Composites: Part A. 2006;37(11):2057-68.
Lee et al., Aligned carbon nanotube film enables thermally induced state transformations in layered polymeric materials. ACS Appl Mater Interf. 2015;7:8900-05.
Lee et al., Carbon fiber prepreg composite laminates cured via conductive curing using nanoengineered nanocomposite heaters. 21st Intl Conf on Composite Materials. Xi'An, China. Aug. 2007. 8 pages.

(56) References Cited

OTHER PUBLICATIONS

Li et al., Hierarchical carbon nanotube carbon fiber unidirectional composites with preserved tensile and interfacial properties. Compos Sci Technol. 2015;117: 139-145. Epub Apr. 30, 2015.

Lomov et al., Compressibility of nanofibre-grafted alumina fabric and yarns: Aligned carbon nanotube forests. Compos Sci Technol. 2014;90:57-66. Epub Nov. 4, 2013.

Louis et al., Out-of-Autoclave Prepreg Processing. In Wiley Encyclopedia of Composites, Second Ed., vol. 5. Jul. 2012. Wiley & Sons. https://doi.org/10.1002/9781118097298.weoc056. 5 pages.

Mazumdar, Composites Manufacturing: Materials, Product, and Process Engineering. Section 6.8.1.5 Methods of Applying Heat and Pressure. CRC Press. 2002. 5 pages.

Mehdikhani et al., Strain mapping at the micro-scale in hierarchical polymer composites with aligned carbon nanotube grafted fibers. Compos Sci Technol. 2016;137:24-34. Epub Oct. 24, 2016.

Olivier et al., Effects of cure cycle pressure and voids on some mechanical properties of carbon/epoxy laminates. Composites. 1995;26(7):509-15.

Parnas et al., The interaction between micro- and macroscopic flow in RTM preforms. Composite Structures. 1994;27(1-2):93-107.

Qian et al., Carbon nanotube-based hierarchical composites: A review. J Mater Chem. 2010;20(23):4751-62.

Romanov et al., Can carbon nanotubes grown on fibers change stress distribution in a composite? Composites: Part A. 2014;63:32-4. Epub Apr. 5, 2014.

Schlimbach et al., Out-of-autoclave curing process in polymer matrix composites. Ch. 14 in Manufacturing Techniques for Polymer Matrix Composites (PMCs). Ed. By Advani et al., pp. 435-480. Woodhead Publishing Ltd.: Cambridge, England. 2012.

Skartsis et al., Resin flow through fiber beds during composite manufacturing processes. Part I: Review of newtonian flow through fiber beds. Polym Eng Sci. Feb. 1992;32(4):221-30.

Spitalsky et al., Carbon nanotube—polymer composites: Chemistry, processing, mechanical and electrical properties. Progress in Polymer Science 2010;35(3):357-401. Epub Sep. 25, 2009.

Swolfs et al., Stress concentrations in hybrid unidirectional fibre-reinforced composites with random fibre packings. Compos Sci Technol. 2013;85:10-16. Epub Jun. 1, 2013.

Vaisman et al., The role of surfactants in dispersion of carbon nanotubes. Adv Colloid Interface Sci. 2006;128-130:37-46. Epub Jan. 10, 2007.

Van Noorden, The trials of the new carbon. Nature. 2011; 469:14-16.

Washburn, The dynamics of capillary flow. Phys. Rev. 1921;17(3):273-83.

Wicks et al., Interlaminar and intralaminar reinforcement of composite laminates with aligned carbon nanotubes. Compos. Sci. Technol. 2010;70(1):20-28.

Wicks et al., Multi-scale interlaminar fracture mechanisms in woven composite laminates reinforced with aligned carbon nanotubes. Compo. Sci. Technol. 2014;100:128-35.

Wu et al., Carbon nanotube film interlayer for strain and damage sensing in composites during dynamic compressive loading. Appl Phys Lett 2012;101(22):221909.

Xu et al., In-situ curing of glass fiber reinforced polymer composites via resistive heating of carbon nanotube films. Composites Sci and Technol. 2017;149:20-7.

Yamamoto et al, High-yield growth and morphology control of aligned carbon nanotubes on ceramic fibers for multifunctional enhancement of structural composites. Carbon 2009;47(3): 551-60.

Zhou et al., A closed form solution for flow in dual scale fibrous porous media under constant injection pressure conditions. Compos Sci Technol. 2008;68(3-4):699-708. Epub Sep. 26, 2007.

\* cited by examiner

Perspective View      Side View

Side View

Perspective View

COMPOSITE ARTICLES COMPRISING NON-LINEAR ELONGATED NANOSTRUCTURES AND ASSOCIATED METHODS

RELATED APPLICATIONS

This application claims priority under 35 U.S.C. § 119(e) to U.S. Provisional Application No. 62/343,604, filed May 31, 2016, and entitled "Composite Articles Comprising Non-Linear Elongated Nanostructures and Associated Methods," which is incorporated herein by reference in its entirety for all purposes.

TECHNICAL FIELD

Composite articles comprising elongated nanostructures, and associated systems and methods, are generally described.

BACKGROUND

Elongated nanostructures can be used to enhance the mechanical, thermal, and/or electrical properties of materials. For example, carbon nanotubes can be used to make composite articles, which are heterogeneous structures comprising two or more components, the combination of which takes advantage of the individual properties of each component as well as synergistic effects if relevant.

Forests of aligned carbon nanotubes and other nanostructures have been used to provide mechanical reinforcement within composite articles. In many cases, however, the mechanical reinforcement provided by the nanostructures is limited to a single dimension.

Improved composite articles and associated systems and methods would be desirable.

SUMMARY

The present disclosure relates to composite articles comprising non-linear elongated nanostructures and associated systems and methods. In certain embodiments, folded collections of carbon nanotubes or other elongated nanostructures can be used to provide mechanical reinforcement along multiple dimensions within a composite article. The subject matter of the present invention involves, in some cases, interrelated products, alternative solutions to a particular problem, and/or a plurality of different uses of one or more systems and/or articles.

In one aspect, articles are provided. In some embodiments, the article comprises a collection of substantially locally aligned elongated nanostructures and a support material within which the collection of elongated nanostructures are arranged, wherein the collection of elongated nanostructures defines a first geometric surface portion of the collection and a second geometric surface portion of the collection opposite the first geometric surface portion, and wherein the collection of elongated nanostructures comprises a first fold comprising at least a first portion of the first geometric surface portion facing at least a second portion of the first geometric surface portion, and a second fold comprising at least a first portion of the second geometric surface portion facing at least a second portion of the second geometric surface portion.

In some embodiments, the article comprises a collection of elongated nanostructures arranged within a support material, wherein the collection has a longitudinal axis that defines a plurality of crests and a plurality of troughs defining at least one amplitude and at least one wavelength, wherein the ratio of the amplitude to the wavelength is at least about 0.5:1, and the elongated nanostructures are substantially locally aligned.

In some embodiments, the article comprises a collection of elongated nanostructures arranged within a support material, wherein the collection has a longitudinal axis that defines a plurality of crests and a plurality of troughs defining at least one amplitude and at least one wavelength, wherein, along at least one wavelength of the collection, the ratio of the amplitude of the collection to a number average distance of nearest neighbor elongated nanostructures within the collection is at least about 3:1.

In some embodiments, the article comprises a collection of elongated nanostructures substantially folded upon itself and arranged within a support material such that the total collection is contained within a region having a folded thickness no greater than about 100 nanometers, wherein the collection defines an essentially continuous structure having a beginning and a terminus and the unfolded length of the collection is at least 10 microns.

In another aspect, methods are provided. In some embodiments, the method comprises applying a force to a collection of elongated nanostructures located adjacent a support material, such that the support material softens and the collection of elongated nanostructures penetrate at least a first surface of the support material, wherein after at least a portion of the time over which the force is applied, the collection of nanostructures comprise a first fold and a second fold.

In some embodiments, the method comprises softening a support material located adjacent a collection of elongated nanostructures, such that the collection of elongated nanostructures penetrate at least a first surface of the support material wherein, after at least a portion of the softening, the collection of nanostructures comprise a first fold and a second fold.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
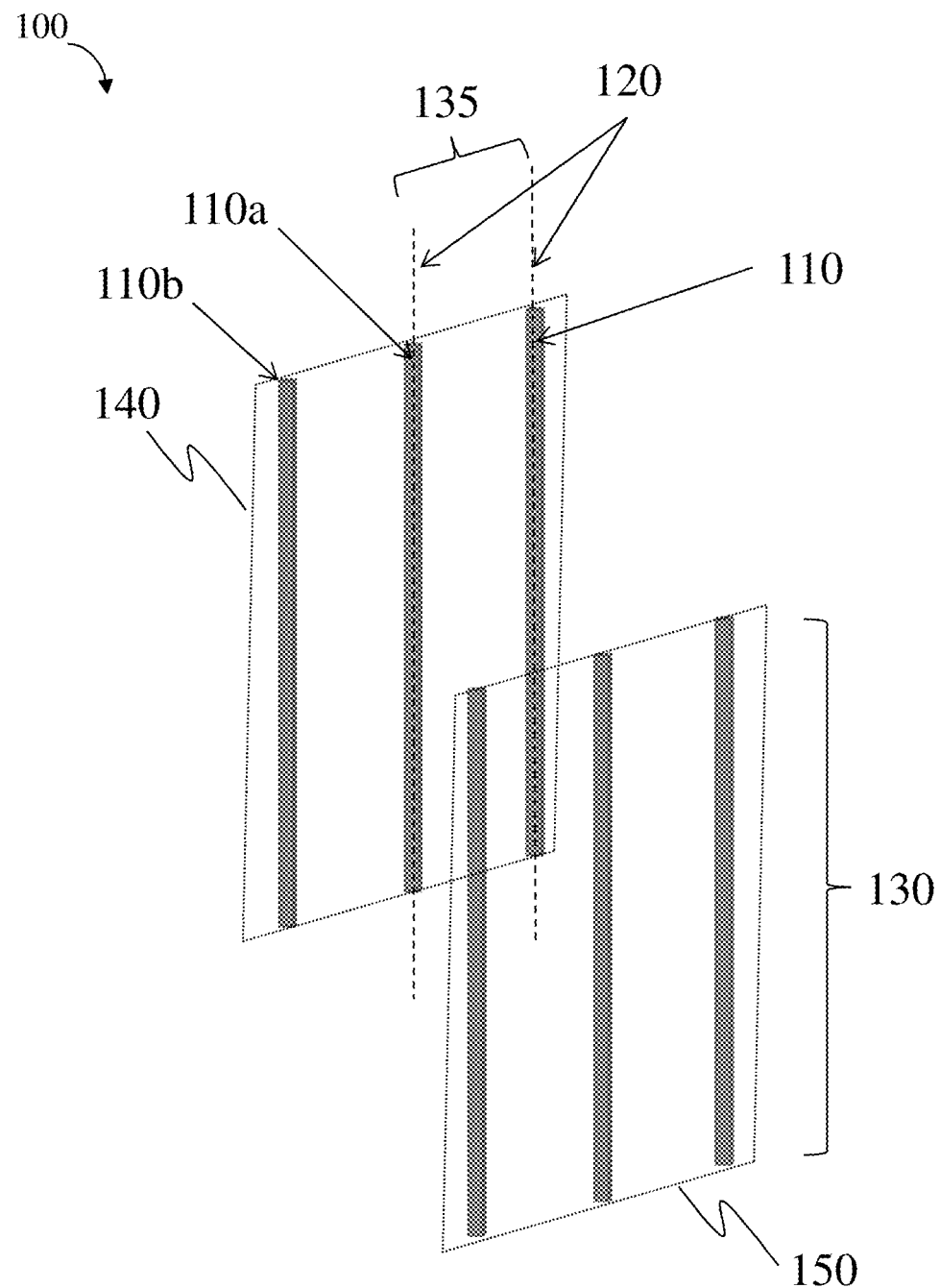
FIG. 1A is a schematic diagram of a collection of elongated nanostructures, according to one set of embodiments.

The present disclosure relates to composite articles comprising non-linear elongated nanostructures and associated systems and methods. In certain embodiments, folded (e.g., buckled) collections of carbon nanotubes or other elongated nanostructures can be used to provide mechanical reinforcement along multiple dimensions within a composite article.

Certain embodiments relate to articles comprising a collection of elongated nanostructures arranged in a non-linear fashion (e.g., folded). The collection of folded nanostructures within the article can be, for example, embedded within a support material (e.g., a polymer), for example, to form a composite material. In some such embodiments, the collection of elongated nanostructures may be folded by applying a force to the collection of elongated nanostructures. Some embodiments comprise softening the support material such that the collection of elongated nanostructures penetrates the support material. In this way, the applied force can be used to fold the collection of elongated nanostructures and to embed at least a portion of the collection of elongated nanostructures within the support material. In certain embodiments, the collection of elongated nanostructures are substantially embedded within one or more support materials (e.g., at an interface between two or more support materials). In certain embodiments, the folded collection of nanostructures (e.g., arranged within the support material) have a particular periodicity (e.g., comprising an amplitude and wavelength).

Certain embodiments are related to articles comprising a collection of elongated nanostructures arranged within a support material. According to certain embodiments, the collection of elongated nanostructures can be embedded within the support material, for example, to form a composite structure. A variety of types of elongated nanostructures and support materials may be used, according to various embodiments. Non-limiting examples of elongated nanostructures include nanotubes and nanofibers (e.g., carbon nanotubes, carbon nanofibers), nanowires (e.g., carbon nanowires), and the like. In some cases, the collection of elongated nanostructures comprises or is part of a nanotube forest. Non-limiting examples of support materials include polymeric materials (inorganic or organic), metals, ceramics, and the like. Additional examples of elongated nanostructures and support materials are provided below.

Generally, a collection of elongated nanostructures corresponds to a plurality of elongated nanostructures arranged in side-by-side fashion with one another. In some embodiments, the collection of elongated nanostructures comprises at least 5, at least 10, at least 50, at least 100, at least 500, at least 1000, or at least 10,000 elongated nanostructures. In certain embodiments, the collection of elongated nanostructures can be a "forest" of elongated nanostructures (e.g., a forest of nanotubes such as carbon nanotubes, a forest of nanowires such as carbon nanowires, a forest of nanofibers such as carbon nanofibers, etc.). In some such embodiments, the collection of elongated nanostructures may comprise at least $10^6$, at least $10^7$, at least $10^8$, at least $10^9$, at least $10^{10}$, at least $10^{11}$, at least $10^{12}$, or at least $10^{13}$ elongated nanostructures. Those of ordinary skill in the art are familiar with suitable methods for forming collections of elongated nanostructures. For example, in some embodiments, the collection of elongated nanostructures can be catalytically grown (e.g., using a growth catalyst deposited via chemical vapor deposition process). In some embodiments, the as-grown forest can be used as is, while in other cases, the as-grown forest may be mechanically manipulated after growth and prior to subsequent processing steps described elsewhere herein (e.g., folding, shearing, compressing, buckling, etc.).

Systems and methods for growing collections of elongated nanostructures are described, for example, in International Patent Application Serial No. PCT/US2007/011914, filed May 18, 2007, entitled "Continuous Process for the Production of Nanostructures Including Nanotubes," published as WO 2007/136755 on Nov. 29, 2007; U.S. patent application Ser. No. 12/227,516, filed Nov. 19, 2008, entitled "Continuous Process for the Production of Nanostructures Including Nanotubes," published as US 2009/0311166 on Dec. 17, 2009; International Patent Application Serial No. PCT/US07/11913, filed May 18, 2007, entitled "Nanostructure-reinforced Composite Articles and Methods," published as WO 2008/054541 on May 8, 2008; International Patent Application Serial No. PCT/US2008/009996, filed Aug. 22, 2008, entitled "Nanostructure-reinforced Composite Articles and Methods," published as WO 2009/029218 on Mar. 5, 2009; U.S. patent application Ser. No. 11/895,621, filed Aug. 24, 2007, entitled "Nanostructure-Reinforced Composite Articles and Methods," published as US 2008/0075954 on Mar. 27, 2008; and U.S. Patent Publication No. 2010/0196695, published on Aug. 5, 2010, and filed as application Ser. No. 12/618,203 on Nov. 13, 2009; each of which is incorporated herein by reference in its entirety for all purposes. In some embodiments, such collections (or forests) could be used as a starting material and, as described below and elsewhere herein, are methods that can be used to manipulate these collections (or forests) to produce buckled and/or folded collections of elongated nanostructures.

FIG. 1A is an exemplary schematic illustration of collection 100 of elongated nanostructures 110. In some embodiments, the elongated nanostructures 110 are provided such that the longitudinal axes of the nanostructures, indicated by dashed lines 120, are substantially locally aligned relative to each other. Each elongated nanostructure may be positioned relative to a nearest neighbor nanostructure at a distance so as to together define a minimum distance between the longitudinal axes of the two nearest neighbor nanostructures. For a given elongated nanostructure, the "nearest neighbor" corresponds to the elongated nanostructure having a longitudinal axis that is closest to the longitudinal axis of the given elongated nanostructure at any point along the longitudinal axis of the given elongated nanostructure. For example, as illustrated in FIG. 1A, elongated nanostructure 110 has nearest neighbor elongated nanostructure 110a. By way of example, elongated nanostructure 110 is not a nearest neighbor with elongated nanostructure 110b.

In some embodiments, the elongated nanostructures may be patterned (e.g., arranged in rows and/or columns). Advantageously, patterning may be used to control the folding (e.g., the wavelength and/or amplitude) of a collection of elongated nanostructures, as described in more detail, below. The elongated nanostructures can be patterned (e.g., arranged in rows and/or columns) by, for example, depositing a growth catalyst on a growth substrate and patterning the catalyst (e.g., using photolithography, screen printing, or any other suitable method) such that it forms rows and/or columns on the growth substrate. Upon growing the elongated nanostructures using the catalyst (e.g., via chemical vapor deposition), rows and/or columns of elongated nanostructures corresponding to the rows of catalyst can be formed. Of course, elongated nanostructures can be grown in rows and/or columns using other suitable methods. In some embodiments, the elongated nanostructures can be grown as a substantially evenly distributed forest, and the nanostructures can be re-positioned in rows by applying a first external force to the sides of the elongated nanostructures, which can compress adjacent nanostructures closer together, resulting in the formation of rows. In some embodiments, a second external force (orthogonal to the first external force) can be applied to the nanostructures to form a collection of elongated nanostructures. Other patterns and/or methods are also possible.

In certain embodiments, the collection has a number average of nearest neighbor distances that is less than 2.5%, less than 1%, less than 0.5%, less than 0.25%, less than 0.1%, or less than 0.05% of the average length of the elongated nanostructures within the collection. For example, as illustrated in FIG. 1A, a collection 100 of elongated nanostructures may have a nearest neighbor distance 135 between two elongated nanostructures (e.g., between elongated nanostructure 110 and elongated nanostructure 110a) and an average length 130. In some embodiments, the number average of nearest neighbor distances within the collection is less than 250 nanometers, less than 200 nanometers, less than 150 nanometers, less than 100 nanometers, less than 50 nanometers, less than 25 nanometers, less than 10 nanometers, or less than 5 nanometers. In certain embodiments, the number average of nearest neighbor distances within the collection is greater than or equal to 2 nanometers, greater than or equal to 5 nanometers, greater than or equal to 10 nanometers, greater than or equal to 25 nanometers, greater than or equal to 50 nanometers, greater than or equal to 100 nanometers, greater than or equal to 150 nanometers, or greater than or equal to 200 nanometers. Combinations of the above-referenced ranges are also possible (less than 250 nanometers and greater than or equal to 2 nanometers). Other ranges are also possible. The number average of nearest neighbor distances within the collection may be calculated by determining the nearest neighbor distance for each nanostructure, then number averaging the nearest neighbor distances. Nearest neighbor distances of the elongated nanostructures as described herein can be determined by 2- and 3-dimensional scanning and transmission electron tomography.

Figure 1B:
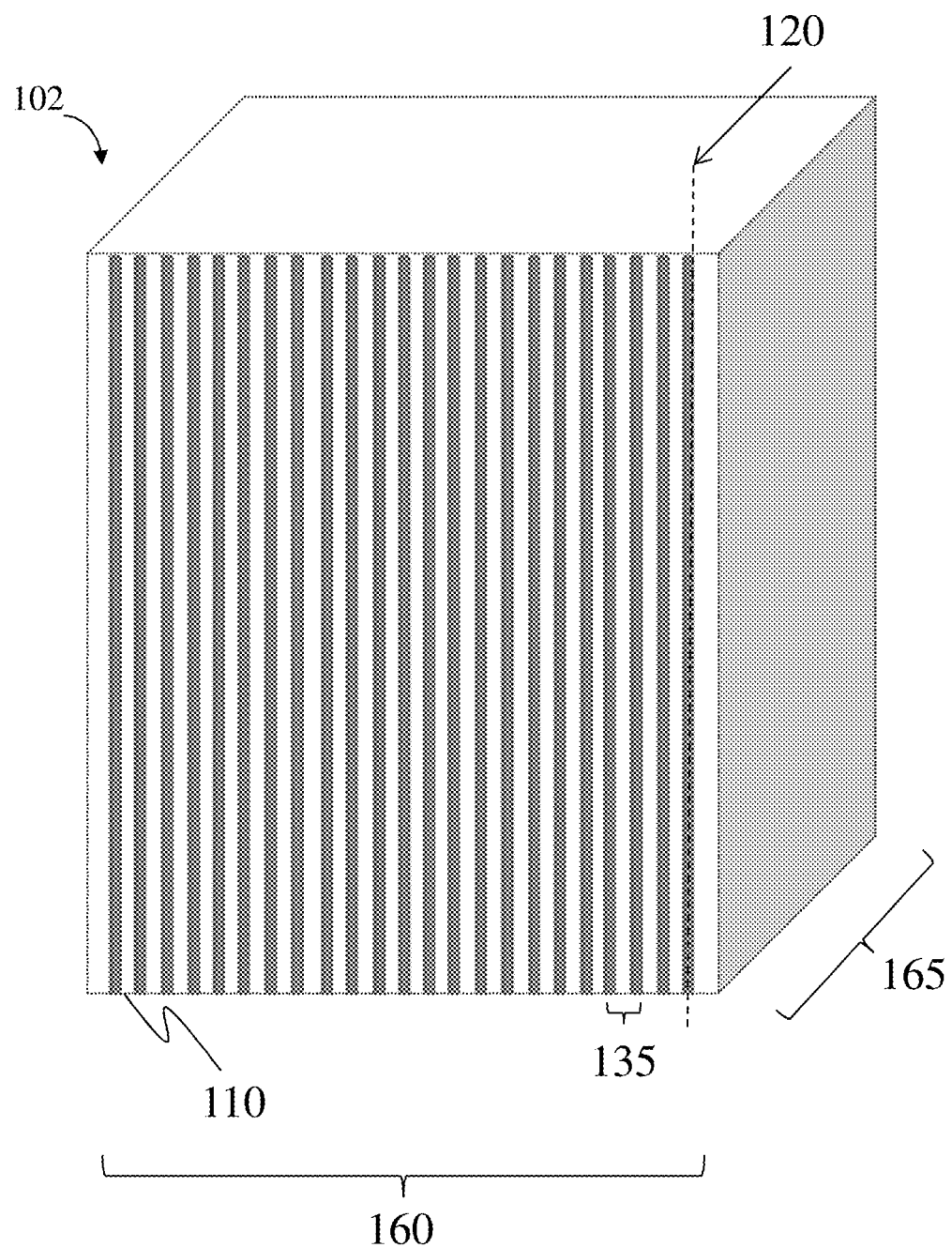
FIG. 1B is a schematic diagram of an exemplary collection of elongated nanostructures, according to one set of embodiments.

In the set of embodiments illustrated in FIG. 1A, the number average of nearest neighbor distances within the collection is roughly equal for each nanostructure. For example, as illustrated in FIG. 1A, nearest neighbor distance 135 is roughly equal between all nearest neighbor elongated nanostructures in the collection. In other embodiments, the distances between adjacent nanostructures may vary. In some embodiments, the collection of elongated nanostructures extends a distance, in each of two orthogonal directions each perpendicular to the longitudinal axes of the nanostructures, that is at least 10 times greater than the number average of nearest neighbor distances within the collection. For example, as shown in FIG. 1B, a collection 102 of elongated nanostructures (comprising elongated nanostructures 110) extends a first distance 160 and a second distance 165. Each of the first distance and the second distance extend in two orthogonal directions, each perpendicular to the longitudinal axes 120 of the nanostructures 110. In some such embodiments, first distance 160 and second distance 165 are each at least 10 times greater than the number average of the nearest neighbor distances within the collection.

In some cases, the plurality of nanostructures extends, in two orthogonal directions each perpendicular to the long axes, a distance at least 100 times greater, at least 1000 times greater, at least 10,000 times greater or longer than the number average of the nearest neighbor distances within the collection. In certain embodiments, the plurality of nanostructures extends, in at least one of two orthogonal directions each perpendicular to the long axes, a distance at least $10^6$ times, at least $10^7$ times, at least $10^8$ times, at least $10^9$ times, or at least $10^{10}$ times greater or longer than the number average of nearest neighbor distances within the collection.

Figure 1C:
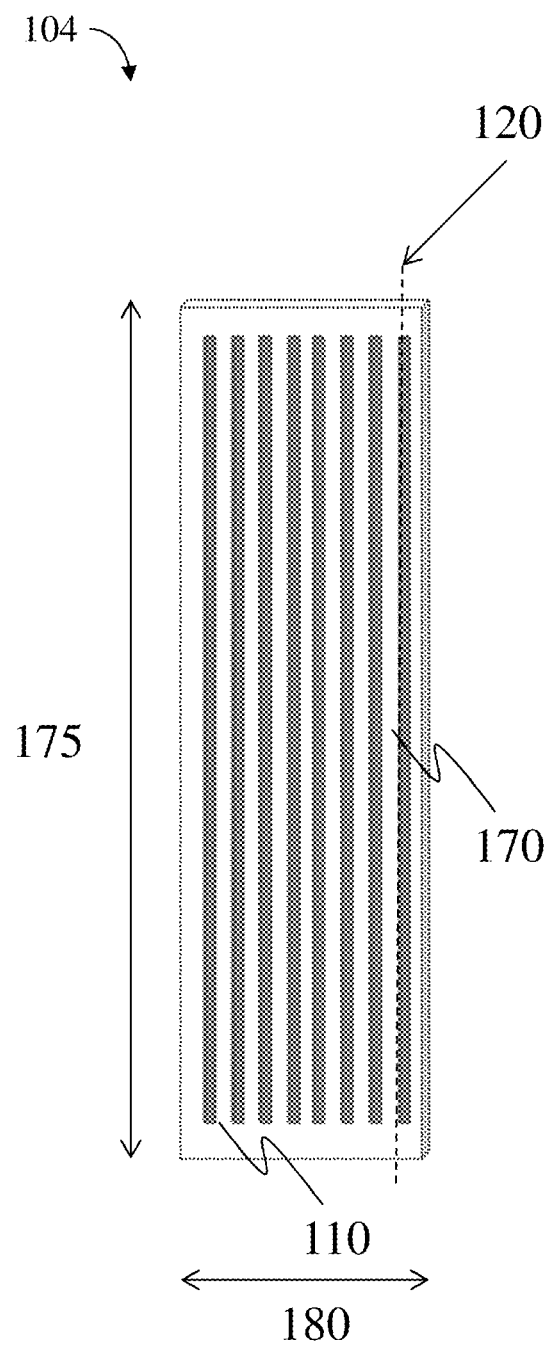
FIG. 1C is a schematic diagram of an exemplary collection of elongated nanostructures, according to one set of embodiments.

The collection of elongated nanostructures may comprise any desirable aspect ratio. In some cases, a collection of elongated nanostructures may be provided such that the collection extends, in at least one dimension (e.g., in one dimension, in two orthogonal dimensions, etc.) substantially perpendicular to the long axes, a distance at least about 1.5 times greater, at least about 2 times greater, at least about 5 times greater, at least about 10 times greater, at least about 25 times greater, at least about 100 times greater, or more than a dimension substantially parallel to the long axes of the elongated nanostructures. As a specific example, the collection of elongated nanostructures may constitute a thin-film such that the long axes of the nanostructures are substantially perpendicular to the largest surface of the film. For example, as illustrated in FIG. 1C, collection 104 of elongated nanostructures comprises elongated nanostructures 110 and the long axes 120 of the nanostructures is substantially parallel to the largest surface 170 of the film. A collection of elongated nanostructures may be provided, in some instances, such that the collection extends, in at least one dimension substantially parallel to the long axes (e.g., dimension 175 in FIG. 1C), a distance at least about 1.5 times greater, at least about 2 times greater, at least about 5 times greater, at least about 10 times greater, at least about 25 times greater, at least about 100 times greater, or more than a dimension substantially perpendicular to the long axes of the elongated nanostructures (e.g., dimension 180 in FIG. 1C). In an alternative embodiment, the collection of elongated nanostructures may be provided such that the collection extends, in at least one dimension substantially perpendicular to the long axes 120 (e.g., dimension 180 in FIG. 1C), a distance at least about 1.5 times greater, at least about 2 times greater, at least about 5 times greater, at least about 10 times greater, at least about 25 times greater, at least about 100 times greater, or more than a dimension substantially parallel to the long axes 120 of the elongated nanostructures (e.g., dimension 175 in FIG. 1C). Those skilled in the art would understand that for elongated structures which are not straight, the aspect ratio is measured along the longitudinal axis of the elongated nanostructure.

In some cases, at least 10%, at least about 20%, at least about 30%, at least about 40%, at least about 50%, at least about 60%, at least about 70%, or more of the elongated nanostructures extend substantially through the length (e.g., at least about 90% of the maximum length of the collection) of the collection of elongated nanostructures (e.g., wherein the length is defined as a dimension substantially parallel to the long axes of the elongated nanostructures, such as length 130 in FIG. 1A). That is to say, in some embodiments, at least 10% (e.g., at least about 20%, at least about 30%, at least about 40%, at least about 50%, at least about 60%, at least about 70%, or more) of the elongated nanostructures have a length that is at least about 90% of the maximum length of the collection of elongated nanostructures, within the collection.

Figures 2A, 2B:
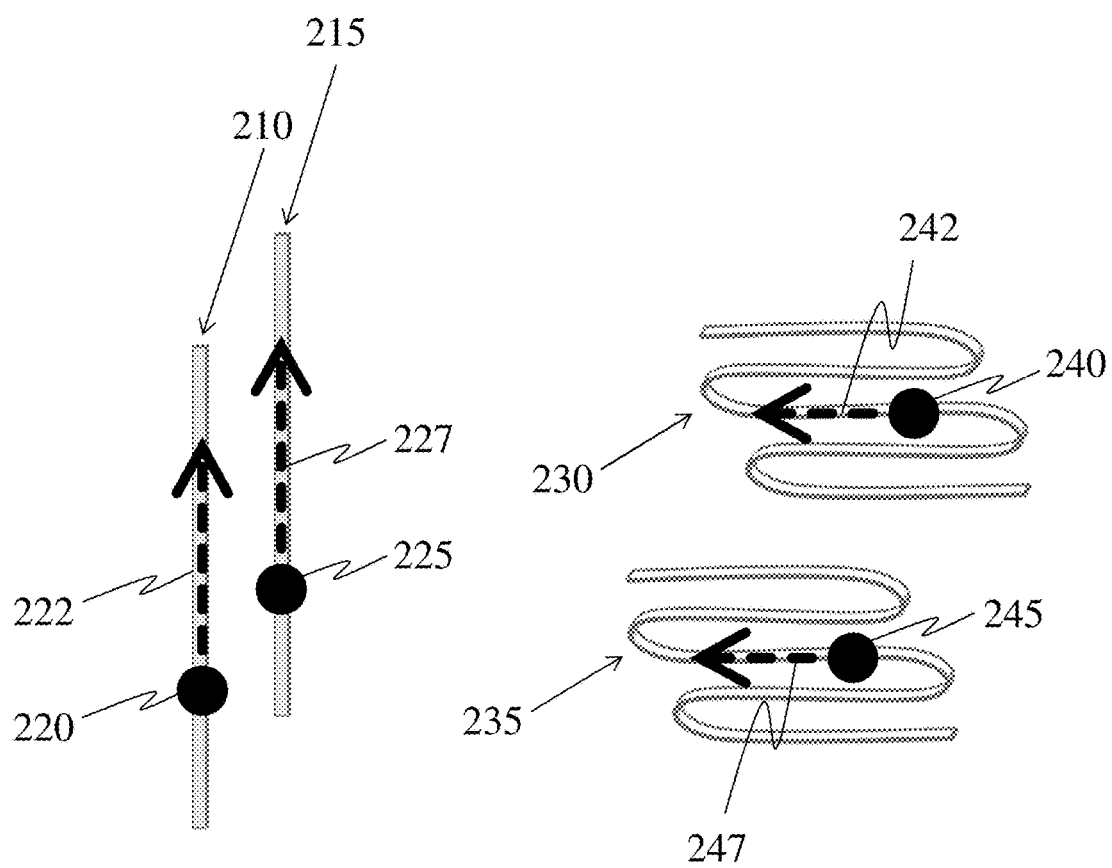
FIG. 2A is a schematic diagram illustrating alignment of elongated nanostructures, according to one set of embodiments.
FIG. 2B is a schematic diagram illustrating alignment of elongated nanostructures, according to one set of embodiments.

According to certain embodiments, the elongated nanostructures within the collection are substantially locally aligned (e.g., prior to folding of the collection of elongated nanostructures). Elongated nanostructures within a collection of elongated nanostructures are said to be substantially locally aligned with each other when at least 50% of the elongated nanostructures are locally aligned with their nearest neighbors within the collection. In some embodiments, at least 50%, at least 60%, at least 70%, at least 80%, or at least 90% of the elongated nanostructures are locally aligned with their nearest neighbors within the collection. First and second elongated nanostructures are said to be locally aligned with each other when one can choose a point on the first of the nanostructures and one can choose a point on the second of the nanostructures, and as one traces a pathway along the longitudinal axes of the first and second nanostructures that extends along at least 50% of at least one of the longitudinal axes of the first and second nanostructures, the distance between the first and second nanostructures does not vary by more than 100% (e.g., does not vary by more than 50%, does not vary by more than 10%) of the average distance between the first and second nanostructures along the pathway. For example, as illustrated in FIG. 2A, elongated nanostructures 210 has a nearest neighbor elongated nanostructure 215, and elongated nanostructures 210 and 215 are locally aligned because pathways can be traced along the longitudinal axes of the elongated nanostructures (beginning on point 220 on elongated nanostructure 210 and point 225 on elongated nanostructure 215), as indicated by dashed arrows 222 and 227, respectively, and the distance between the two nanostructures does not vary by more than 100% (e.g., does not vary by more than 10%) of the average distance between the two nanostructures along the pathways.

In some embodiments, as described in more detail below, a collection of elongated nanostructures may be folded. In some such embodiments, at least 50% (e.g., at least 60%, at least 70%, at least 80%, at least 90%) of the elongated nanostructures are locally aligned with at least one other elongated nanostructure in the folded collection. For example, as illustrated in FIG. 2B, folded elongated nanostructure 230 has a nearest neighbor folded elongated nanostructure 235, and folded elongated nanostructures 230 and 235 are locally aligned because pathways can be traced along the longitudinal axes of the folded elongated nanostructures (beginning on point 240 on folded elongated nanostructure 230 and point 245 on folded elongated nanostructure 235), as indicated by dashed arrows 242 and 247, respectively, and the distance between the two folded nanostructures does not vary by more than 10% of the average distance between the two nanostructures along the pathways.

Local alignment of the elongated nanostructures as described herein can be determined by 3-dimensional electron tomography.

Figures 2C, 2D:
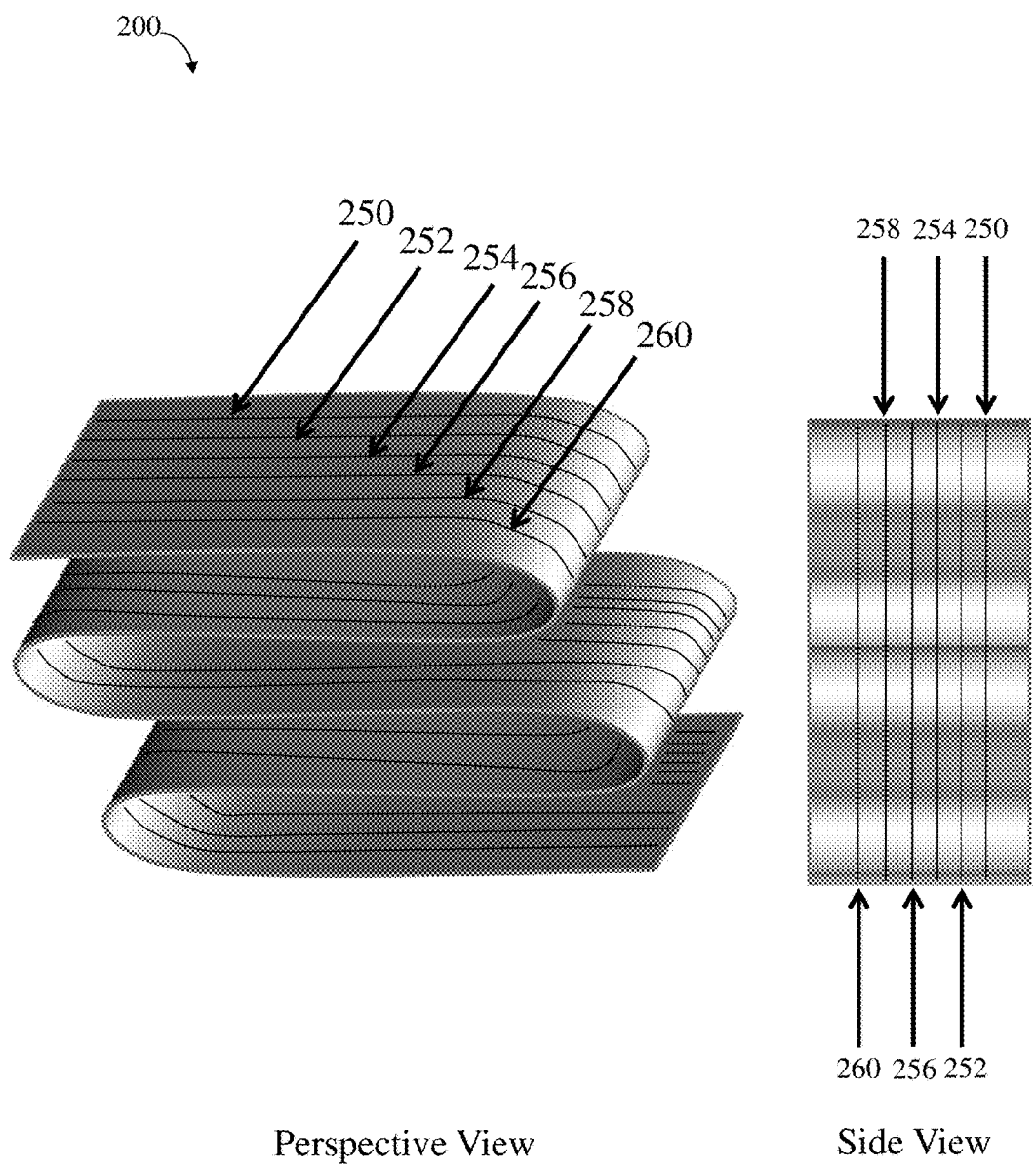
FIG. 2C is a schematic diagram illustrating alignment of elongated nanostructures, according to one set of embodiments.
FIG. 2D is a schematic diagram illustrating alignment of elongated nanostructures, according to one set of embodiments.

In some embodiments, when viewed from at least one perspective (e.g., by 3-dimensional electron tomography), at least two elongated nanostructures are substantially parallel to within 30 degrees of each other, within 20 degrees of each other (or, in some embodiments, within 10 degrees, within 5 degrees, within 2 degrees, or within 1 degree of each other). In an exemplary embodiment, as illustrated in FIG. 2C, a folded collection 200 of elongated nanostructures comprises elongated nanostructures 250, 252, 254, 256, 258, and 260. In some such embodiments, two or more elongated nanostructures, when viewed from at least one perspective (e.g., a side view perspective) are substantially parallel to within 30 degrees of each other in the folded collection. For example, as shown in FIG. 2D, substantial alignment of elongated nanostructures 250, 252, 254, 256, 258, and 260 is readily observable in a side view perspective of folded collection 200 of elongated nanostructures (e.g., a side view perspective readily obtained during 3-dimensional electron tomography).

In some embodiments, at least 10%, at least 20%, at least 30%, at least 40%, or at least 50% of the elongated nanostructures are parallel to within 10 degrees of another elongated nanostructure. Those skilled in the art would understand that, in some cases, elongated nanostructures may have some inherent deviation along their length such as waviness. In some such cases, two elongated nanostructures are said to be substantially parallel when a line drawn from beginning to terminus of a first nanostructure is substantially parallel (e.g., within 10 degrees) with a line drawing from beginning to terminus of a second nanostructure.

In some embodiments, longitudinal axes of at least about 50% of the elongated nanostructures are parallel within 10 degrees to at least one other elongated nanostructure (e.g., the longitudinal axes 120 of elongated nanostructure 110 in FIG. 1A are parallel within 20 degrees of elongated nanostructure 110a and elongated nanostructure 110b). In certain embodiments, the longitudinal axes of at least about 50% of the elongated nanostructures are parallel within 10 degrees, within 8 degrees, within 5 degrees, within 3 degrees, or within 1 degree of at least one other elongated nanostructure. In some embodiments, the longitudinal axes of at least about 50% of the elongated nanostructures are substantially parallel with at least one other elongated nanostructure.

In some embodiments, the elongated nanostructures within the collection may be closely spaced. For example, the number average of the nearest neighbor distances of the elongated nanostructures within the collection may be less than about 250 nm, less than about 200 nm, less than about 100 nm, less than about 80 nm, less than about 60 nm, less than about 40 nm, less than about 30 nm, less than about 20 nm, less than about 10 nm, less than about 5 nm, or less. In certain embodiments, the number average of the nearest neighbor distances of the elongated nanostructures within the collection may be at least about 1 nm, at least about 5 nm, at least about 10 nm, at least about 20 nm, at least about 30 nm, at least about 40 nm, at least about 60 nm, at least about 80 nm, at least about 100 nm, or at least about 200 nm. Combinations of the above-referenced ranges are also possible (e.g., at least about 1 nm and less than about 250 nm). Other ranges are also possible.

In some cases, the nanostructure materials or the nanocomposites may comprise a high volume fraction of nanostructures. For example, the volume fraction of the nanostructures within the materials may be at least about 10%, at least about 20%, at least about 40%, at least about 60%, at least about 70%, at least about 75%, at least about 78%, or higher.

The collection of elongated nanostructures generally defines a geometric surface. In this context, a "geometric surface" of a collection of elongated nanostructures refers to the surface defining the outer boundaries of the collection. The geometric surface is generally observable at the same scale as the maximum cross sectional dimension of the collection of elongated nanostructures. The geometric surface area does not include the internal surface area of the collection of elongated nanostructures (e.g., the area within pores of the nanostructures or within the collection of nanostructures, or surface area of those fibers of a collection that are contained within the collection and do not define the outer boundary of the collection, etc.).

According to certain embodiments, the collection of elongated nanostructures defines a first geometric surface portion of the collection and a second geometric surface portion of the collection opposite the first geometric surface portion of the collection. For example, referring again to FIG. 1A, collection 100 of elongated nanostructures 110 defines first geometric surface portion 140. In FIG. 1A, collection 100 of elongated nanostructures 110 also defines second geometric surface portion 150 which is opposite first geometric surface portion 140.

In some embodiments, the first geometric surface portion has an aspect ratio of at least 1:100, at least 1:10, at least 1:1, at least 10:1, at least 20:1, at least 50:1, or at least 100:1. In certain embodiments, the first geometric surface portion has an aspect ratio of less than or equal to 200:1, less than or equal to 100:1, less than or equal to 50:1, less than or equal to 20:1, less than or equal to 10:1, less than or equal to 1:1, or less than or equal to 1:10. Combinations of the above-referenced ranges are also possible (e.g., an aspect ratio of at least 10:1 and less than or equal to 200:1, an aspect ratio of at least 1:100 and less than or equal to 1:1). Other ranges are also possible.

In certain embodiments, the second geometric surface portion has an aspect ratio of at least 1:100, at least 1:10, at least 1:1, at least 10:1, at least 20:1, at least 50:1, or at least 100:1. In certain embodiments, the second geometric surface portion has an aspect ratio of less than or equal to 200:1, less than or equal to 100:1, less than or equal to 50:1, less than or equal to 20:1, less than or equal to 10:1, less than or equal to 1:1, or less than or equal to 1:10. Combinations of the above-referenced ranges are also possible (e.g., an aspect ratio of at least 10:1 and less than or equal to 200:1, an aspect ratio of at least 1:100 and less than or equal to 1:1). Other ranges are also possible.

In some embodiments, at least a portion of the first geometric surface portion and at least a portion of the second geometric surface portion are within 20 degrees (or within 5 degrees, or within 2 degrees, or within 1 degree) of parallel.

The collection of elongated nanostructures can have, in some embodiments, at least one fold. Those of ordinary skill in the art would understand the meaning of the term fold in the context of a collection of elongated nanostructures, in which the collection is arranged such that the longitudinal axes of the elongated nanostructures within the collection double back to form a crest along the longitudinal axes.

Figures 3A, 3B:
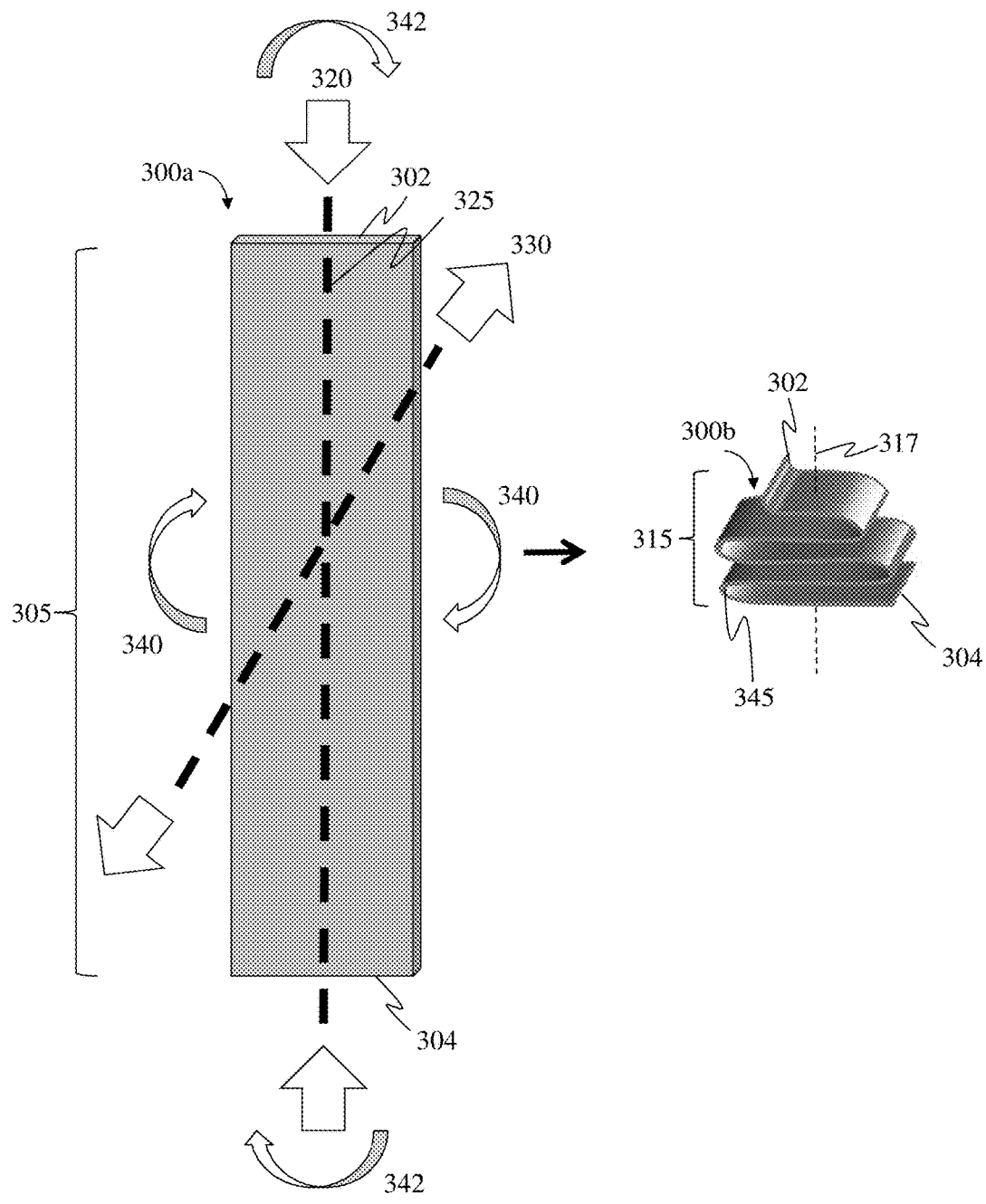
FIG. 3A is a schematic diagram illustrating the folding of a collection of elongated nanostructures, according to one set of embodiments.
FIG. 3B is a schematic diagram illustrating the folding of a collection of elongated nanostructures, according to one set of embodiments.

For example, as illustrated in FIGS. 3A-3B, in some embodiments, a collection 300a of elongated nanostructures can be folded to form a folded collection 300b of elongated nanostructures (e.g., comprising one or more folds such as fold 345). In some embodiments, one or more forces may be applied to the collection of elongated nanostructures to form the folded collection. In some such embodiments, the one or more forces may cause the collection of elongated nanostructures to buckle. In certain embodiments, the buckling may result in the formation of crests (e.g., along the longitudinal axis of the collection of elongated nanostructures) such that one or more folds are formed. In some embodiments, a first force may be applied along the longitudinal axes of the collection of elongated nanostructures such one or more folds are formed. In the set of embodiments illustrated in FIG. 3A, for example, the first force may be applied as a compressive force in the direction of arrow 320. In some embodiments, a compressive force can be applied substantially parallel to the longitudinal axes (e.g., in the direction of arrow 320 in FIG. 3A), until at least one fold forms.

In certain embodiments, a second force may be applied substantially orthogonal to the longitudinal axes of the collection of elongated nanostructures such one or more folds are formed. In the set of embodiments illustrated in FIG. 3A, the second force may be applied as a tensile force or as a compressive force in the direction of arrow 330. In some embodiments, the first force and/or the second force may cause the collection of elongated nanostructures to buckle (e.g., such that one or more folds are formed).

In some cases, a shear force may be applied to the collection of elongated nanostructures such one or more folds are formed. In the set of embodiments illustrated in FIG. 3A, the shear force may be applied as a torsional moment in the direction of arrows 340 and/or a torsional moment in the direction of arrows 342. In some such embodiments, the application of one or more torsional moments may cause the collection of elongated nanostructures to form one or more folds. In certain embodiments, the shear force may be applied to the collection of elongated nanostructures by applying a first force parallel to surface 302 and a second force, equal in magnitude but opposite in direction to the first force, parallel to surface 304.

In certain embodiments, the formation of one or more folds in a collection of elongated nanostructures results from a combination of one or more of the first force, the second force, and the shear force. For example, as illustrated in FIG. 3A, one or more forces may be applied to collection 300a of elongated nanostructures resulting in the formation of the folded collection 300b. In some embodiments, the shear force may cause the collection of elongated nanostructures to buckle (e.g., such that one or more folds are formed).

Figure 3C:
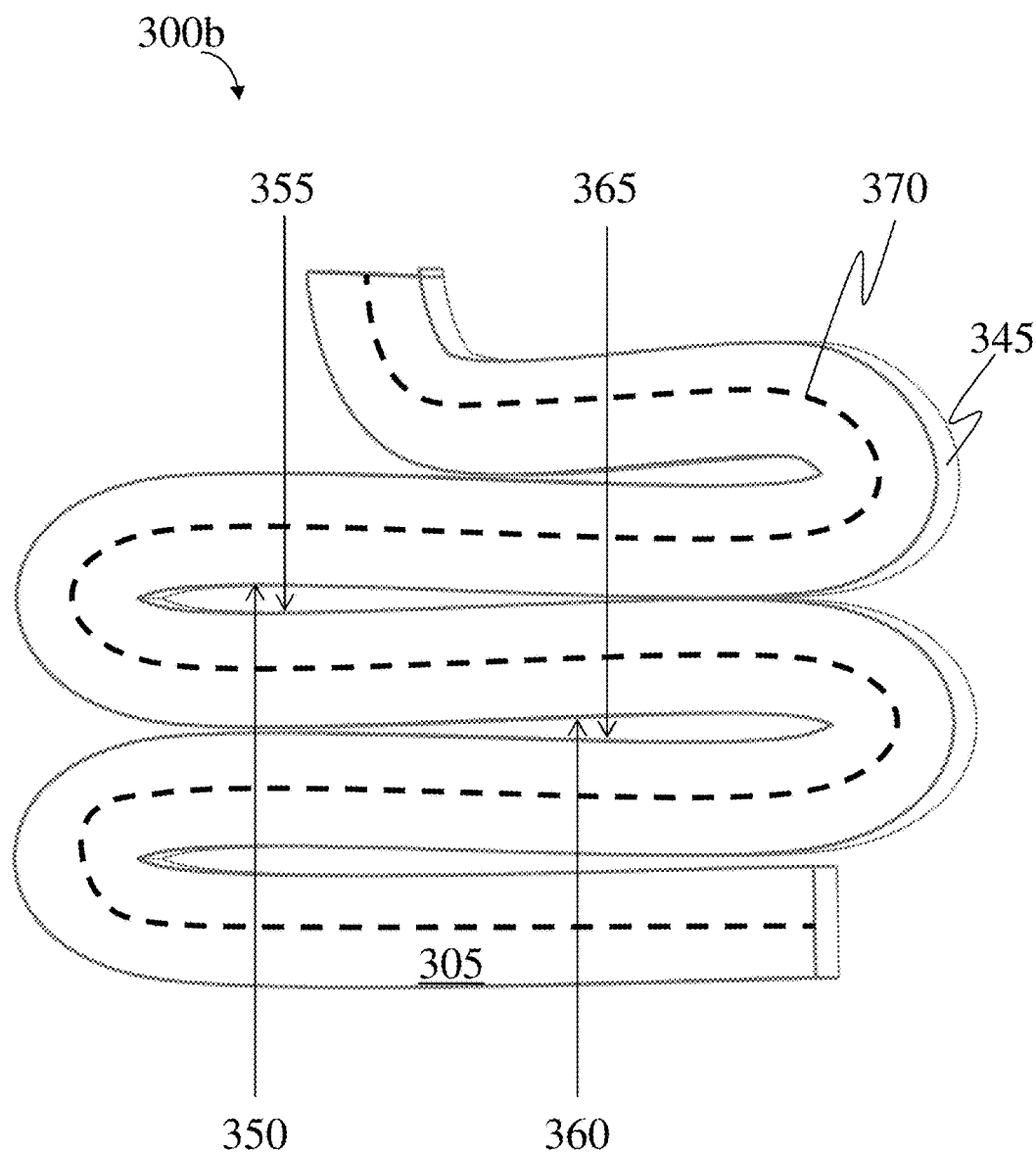
FIG. 3C is a schematic diagram of a folded collection of elongated nanostructures, according to one set of embodiments.

As described above, in some embodiments, the collection of elongated nanostructures comprises a first geometric surface and a second geometric surface (e.g., geometric surfaces 140 and 150 in FIG. 1A). In some embodiments, the collection of elongated nanostructures comprises a first fold comprising at least a first portion of the first geometric surface portion facing at least a second portion of the first geometric surface portion. The folded collection of elongated nanostructures can also comprise, according to certain embodiments, a second fold comprising at least a first portion of the second geometric surface portion facing at least a second portion of the second geometric surface portion. For example, as illustrated in FIG. 3C, folded collection 300b of elongated nanostructures comprises a first portion 350 of a first geometric surface facing a second portion 355 of the first geometric surface. In some embodiments, folded collection 300b of elongated nanostructures comprises a first portion 360 of a second geometric surface facing a second portion 365 of the second geometric surface. For example, first and second surfaces are said to be "facing" when the first surface has at least a portion that is within 20 degrees of parallel to at least a portion of the second surface. In some embodiments, surfaces that are facing each other may have at least a portion of the surfaces that are within 15 degrees of parallel, 10 degrees of parallel, or 5 degrees of parallel of each other.

According to certain embodiments, the first portion of the first geometric surface portion and the second portion of the first geometric surface portion are aligned within 20 degrees of parallel, within 10 degrees of parallel, within 5 degrees of parallel, within 2 degrees of parallel, or within 1 degree of parallel. In some embodiments, the first portion of the second geometric surface portion and the second portion of the second geometric surface portion are aligned within 10 degrees of parallel, within 5 degrees of parallel, within 2 degrees of parallel, or within 1 degree of parallel. For example, referring again to FIG. 3C, first portion of a first geometric surface portion 350 is within 10 degrees of parallel with second portion of the first geometric surface portion 355.

In some such embodiments, the collection defines an essentially continuous structure having a beginning and a terminus. For example, as illustrated in FIG. 3B, folded collection 300b is an essentially continuous structure having a beginning 302 and a terminus 304.

In some such embodiments, the length of the collection is at least about 10 microns prior to folding of the collection. For example, as illustrated in FIG. 3A, collection 300a of elongated nanostructures has an unfolded length 305 of at least about 10 microns. In some such embodiments, the length of the collection is at least 15 microns, at least 20 microns, at least 30 microns, at least 50 microns, at least 100 microns, at least 200 microns, or at least 500 microns prior to folding of the collection. In certain embodiments, the length of the collection is up to 1000 microns, or more, prior to folding the collection.

According to certain embodiments, the collection of elongated nanostructures is substantially folded upon itself and arranged within a support material such that the total collection is contained within a region having a folded thickness no greater than about 1 micron. In certain embodiments, the total collection is contained within a region having a folded thickness no greater than about 1 micron, about 100 nanometers, about 50 nanometers, about 20 nanometers, or about 10 nanometers. As illustrated in FIG. 3A, the folded thickness (folded thickness 315) of the collection of elongated nanostructures may be determined by measuring the longest dimension 317 the transversely spans the folds (e.g., the geometric center of at least two geometric surfaces of the collection of elongated nanostructures).

In certain embodiments, a ratio of the unfolded length (e.g., length 305) of the collection of elongated nanostructures to the folded thickness (e.g., folded thickness 315) is less than or equal to about 10000:1, less than or equal to about 1000:1, less than or equal to about 100:1, less than or equal to about 50:1, less than or equal to about 20:1, less than or equal to about 10:1, or less than or equal to about 5:1. In some embodiments, the ratio of the unfolded length of the collection of elongated nanostructures to the folded thickness is greater than about 2:1, greater than about 5:1, greater than about 10:1, greater than about 20:1, greater than about 50:1, greater than about 100:1, greater than about 1000:1. Combinations of the above-referenced ranges are also possible (e.g., less than or equal to about 10000:1 and greater than about 2:1). Other ranges are also possible.

Figure 3D:
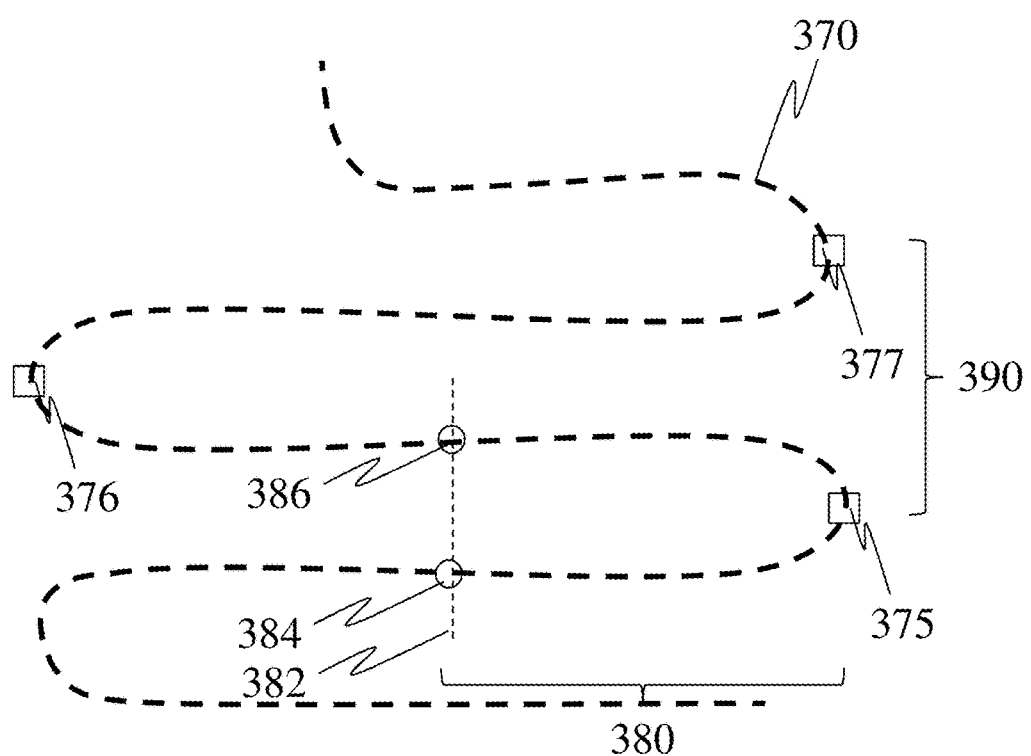
FIG. 3D is a schematic diagram illustrating the amplitude and wavelength of a folded collection of elongated nanostructures, according to one set of embodiments.

According to some embodiments, the collection of elongated nanostructures has a longitudinal axis 370 (e.g., as shown in FIGS. 3C and 3D) that defines a plurality of crests and a plurality of troughs defining at least one amplitude and at least one wavelength. For example, as illustrated in FIGS. 3C and 3D, folded collection 300b of elongated nanostructures has longitudinal axis 370 comprising crest 375, trough 376, and crest 377 which define at least one amplitude and at least one wavelength.

According to certain embodiments, the collection of folded elongated nanostructures has an average amplitude of at least about 5 microns, at least about 10 microns, at least about 50 microns, at least about 100 microns, at least about 500 microns, at least about 1 mm, or at least about 5 mm. In certain embodiments, the collection of folded elongated nanostructures has an average amplitude of less than or equal to about 10 mm, less than or equal to about 5 mm, less than or equal to about 1 mm, less than or equal to about 500 microns, less than or equal to about 100 microns, less than or equal to about 50 microns, or less than or equal to about 10 microns. Combinations of the above referenced ranges are also possible (e.g., at least about 5 microns and less than or equal to about 10 mm). Other ranges are also possible. For example, turning now to FIG. 3D, at least one amplitude of longitudinal axis 370 can be determined by measuring the minimum distance (e.g., distance 380) between a crest (e.g., crest 375) and a line (e.g., line 382) bisecting two proximate points of inflection (e.g., proximate points of inflection 384 and point of inflection 386). The average amplitude of the collection of elongated nanostructures can be determined by taking a number average of the amplitudes of the longitudinal axis.

In some embodiments, the folded collection of elongated nanostructures has an average wavelength of at least about 0.5 microns, at least about 1 micron, at least about 2 microns, at least about 5 microns, at least about 10 microns, or at least about 20 microns. In certain embodiments, the folded collection of elongated nanostructures has an average wavelength of less than or equal to about 50 microns, less than or equal to about 20 microns, less than or equal to about 10 microns, less than or equal to about 5 microns, less than or equal to about 2 microns, or less than or equal to about 1 micron. Combinations of the above-referenced ranges are also possible (e.g., at least about 0.5 microns and less than or equal to about 50 microns, at least about 1 micron and less than or equal to about 10 microns). Other ranges are also possible. For example, turning now to FIG. 3D, at least one wavelength can be determined by measuring the distance (e.g., distance 390) between two proximate crests (e.g., crest 375 and crest 377) of the longitudinal axis. The average wavelength of the collection of elongated nanostructures can be determined by taking an average of the wavelengths of the longitudinal axis.

In some embodiments, the ratio of the amplitude to the wavelength is at least about 0.1:1, at least about 0.5:1, at least about 1:1, at least about 2:1, at least about 10:1, at least about 50:1, at least about 100:1, at least about 500:1, at least about 1000:1, at least 5000:1, or at least about 10000:1. In certain embodiments, the ratio of the amplitude to the wavelength is less than or equal to about 20000:1, less than or equal to about 10000:1, less than or equal to about 5000:1, less than or equal to about 1000:1, less than or equal to about 500:1, less than or equal to about 100:1, less than or equal to about 50:1, less than or equal to about 10:1, less than or equal to about 2:1, less than or equal to about 1:1, or less than or equal to about 0.5:1. Combinations of the above referenced ranges are also possible (e.g., at least about 0.1:1 and less than or equal to about 20000:1). Other ranges are also possible. In some embodiments, the average distance between two proximate crests of the longitudinal axis is less than the distance between a crest and a line bisecting two proximate points of inflection. For example, as illustrated in FIG. 3D, the average distance 390 between proximate crests 375 and 377 is less than the distance 380 between crest 375 and line 382 (bisecting proximate points of inflection 384 and point of inflection 386).

In certain embodiments, along at least one wavelength of the collection, the ratio of the amplitude of the collection to the number average of the nearest neighbor distances within the collection is at least about 20:1. In some embodiments, along at least one wavelength of the collection, the ratio of the wavelength of the collection to the number average of the nearest neighbor distances within the collection is at least about 50:1, at least about 100:1, at least about 500:1, or at least about 1000:1.

In some embodiments, the collection of elongated nanostructures may be provided as a self-supporting material. In other cases, the collection of elongated nanostructures may be attached to a support material. In some such embodiments, the long axes of the elongated nanostructures (e.g., prior to folding) are substantially locally aligned and non-parallel to the support material.

In some cases, a composite material comprises the collection of elongated nanostructures arranged within the support material. For example, in certain embodiments, the collection of elongated nanostructures may be at least partially embedded within the support material (e.g., a matrix material). In some embodiments, the collection of elongated nanostructures may be substantially embedded within the support material (e.g., wherein at least 90%, at least 95%, at least 98%, or at least 99% of the elongated nanostructures are embedded from beginning to terminus of each elongated nanostructure within the support material). In certain embodiments, substantially all (100%) of the collection of elongated nanostructures is substantially embedded within the support material. A composite material comprising the collection of elongated nanostructures may have, according to certain but not necessarily all embodiments, desirable advantageous properties including, for example, improved mechanical properties (e.g., increased strength, increased elastic modulus) as compared to the support material alone.

Figure 4A:
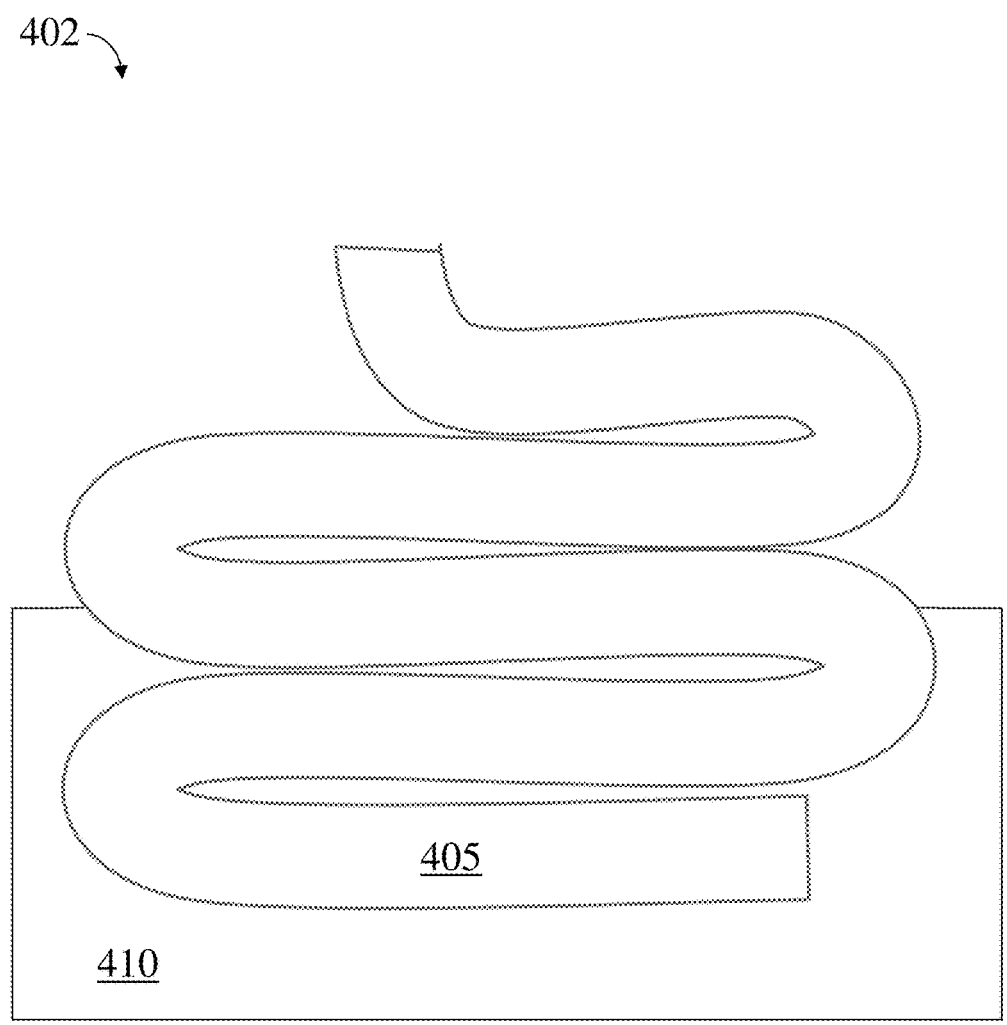
FIG. 4A is a schematic diagram of an article comprising a folded collection of elongated nanostructures, according to one set of embodiments.

As noted above, in some embodiments, the collection of nanostructures can be arranged within the support material. In some cases, the folded collection of elongated nanostructures may be at least partially embedded within the support material. Turning now to FIG. 4A, in some embodiments, article 402 comprises folded collection 405 of elongated nanostructures partially embedded within support material 410. In some embodiments, at least about 30 vol %, at least about 50 vol %, at least about 60 vol %, at least about 70 vol %, at least about 80 vol %, or at least about 90 vol % of the folded collection of elongated nanostructures are embedded within the support material. In some cases, the collection of elongated nanostructures may be folded prior to at least partially embedding the collection within the support material. In certain embodiments, however, the collection of elongated nanostructure may be in contact with, or at least partially embedded in, the support material prior to folding of the collection. In some such embodiments, the collection of elongated nanostructures may become at least partially embedded within the support material upon folding of the collection, as described in more detail below.

Figure 4B:
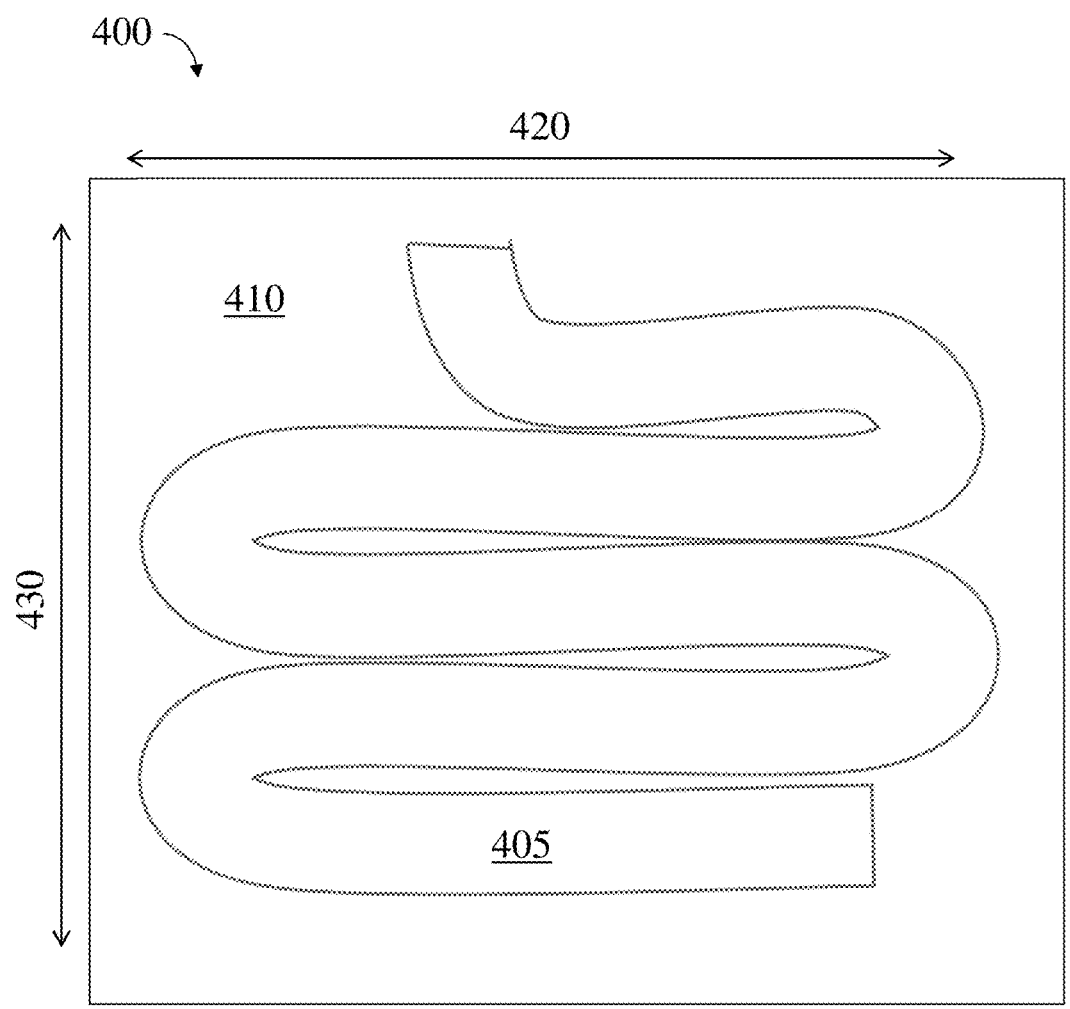
FIG. 4B is a schematic diagram of an article comprising a folded collection of elongated nanostructures, according to one set of embodiments.

In certain embodiments, the collection of nanostructures is embedded within the support material. For example, as illustrated in FIG. 4B, article 400 comprises folded collection 405 of elongated nanostructures embedded within support material 410. In some cases, the collection of elongated nanostructures may be folded prior to embedding within the support material. In certain cases, however, the long axes of the elongated nanostructures are substantially locally aligned and embedded within the support material prior to folding of the collection of elongated nanostructures. For example, referring again to FIG. 3A, collection 300a of nanostructures may be embedded within a support material (not shown) and folded such that it forms folded collection 300b (see, e.g., FIG. 3B) of nanostructures embedded within the support material.

Figure 4C:
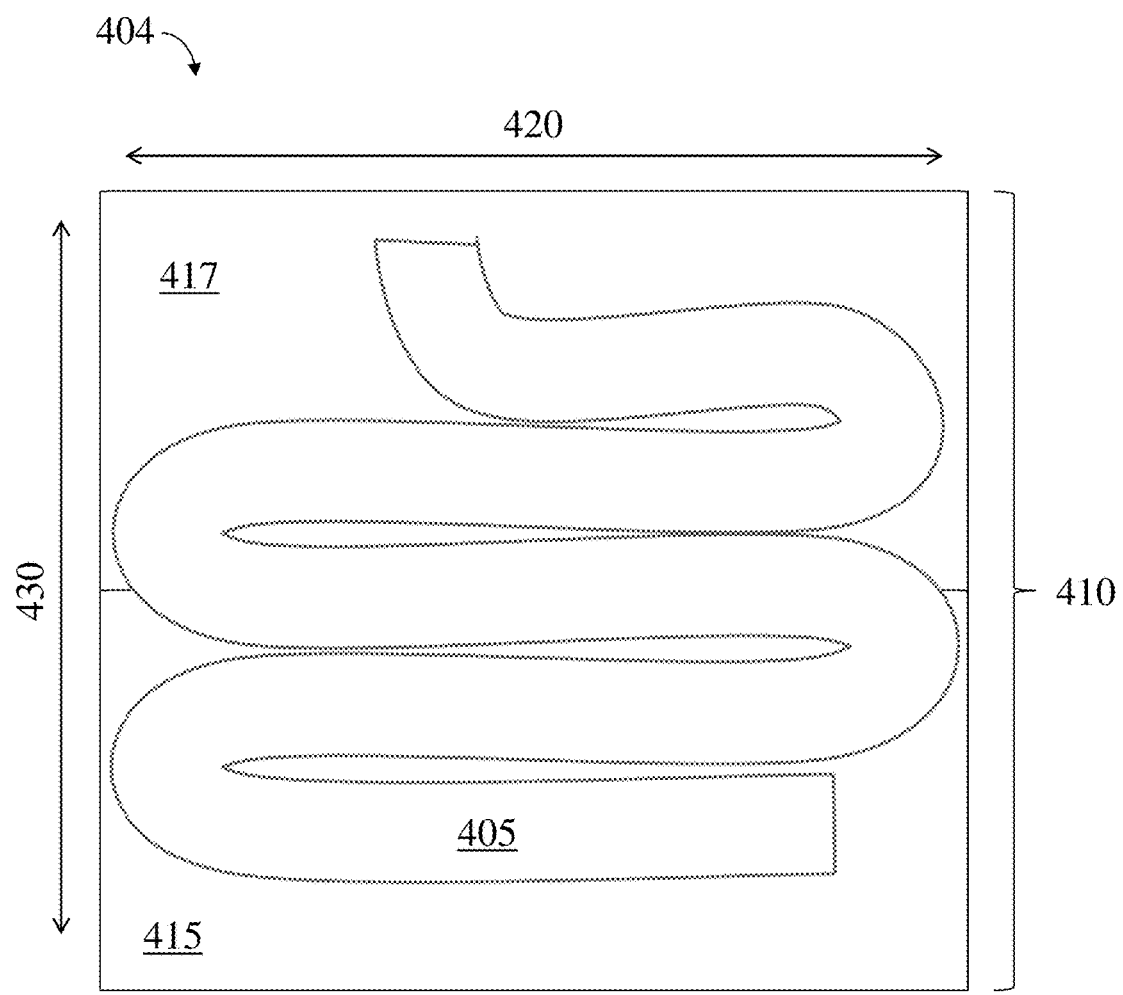
FIG. 4C is a schematic diagram of an article comprising a folded collection of elongated nanostructures, according to one set of embodiments.

In some embodiments, the collection of elongated nanostructures may be completely encapsulated by the support material or a combination of support materials. In certain embodiments, the folded collection of elongated nanostructures may span the interface between two substrates. According to certain embodiments, the support material comprises a first substrate and a second substrate located relative to the first substrate such that an interface is formed between the first substrate and the second substrate. In some embodiments, the collection of elongated nanostructures is located at the interface between the first substrate and the second substrate. According to certain embodiments, the collection of elongated nanostructures penetrate the first substrate and the second substrate. For example, as illustrated in FIG. 4C, article 404 comprises folded collection 405 of elongated nanostructures and support material 410. In some such embodiments, folded collection 405 of elongated nanostructures is at least partially embedded within (e.g., penetrates) a first substrate 415 of support material 410 and at least partially embedded within (e.g., penetrates) a second substrate 417 of support material 410, such that folded collection 405 of elongated nanostructures spans the interface between first substrate 415 and second substrate 417. In some cases however, the support material may comprise the first substrate and the second substrate located relative to the first substrate such that an interface is formed between the first substrate and the second substrate, and the folded collection of elongated nanostructures is embedded in the first substrate, but not the second substrate. In some embodiments, the first substrate and the second substrate comprise the same material. In other embodiments, however, the first substrate and the second substrate may comprise different materials. For example, first substrate 415 may comprise a first prepreg material and the second substrate 417 may comprise a second prepreg material, different than the first prepreg material. In some embodiments, one or more substrates comprise a polymer fiber, soft metal, or sol gel. In certain embodiments, one or more substrates comprise a plurality of dry fibers (e.g., woven fibers, composite fibers). Additional suitable substrates are described, for example, in U.S. patent Ser. No. 13/679,371, filed Nov. 16, 2012, entitled "Nanostructure-reinforced composite articles and methods", published as US 2013/00142987 on Jun. 6, 2013, which is incorporated herein by reference in its entirety for all purposes. In some embodiments, the composite may include multiple layers of support materials.

In some embodiments, the composite comprising the elongated nanostructures and support material is mostly solid. In certain embodiments, there is only a relatively low amount of gas present within the volume of the composite. The volume of the composite is generally defined by the external geometric surfaces of the composite. In some such embodiments, the composite is at least 95% non-gas (e.g., at least 99% non-gas) within the volume of the composite.

In some embodiments, the composite is at least 95% solid. For example, in certain embodiments, the composite is at least 98% solid, 99% solid, or 99.5% solid. Other ranges are also possible. In certain embodiments, the composite is substantially completely solid (e.g., 100% solid).

The presence of a folded collection of elongated nanostructures within composite materials may impart desirable properties. For example, in some cases a composite material may exhibit a higher mechanical strength and/or toughness when compared to an essentially identical material lacking a folded collection of elongated nanostructures (e.g., comprising an unfolded collection of elongated nanostructures) under essentially identical conditions. In some cases, composite material may exhibit a higher thermal and/or electrical conductivity when compared to an essentially identical composite material lacking the folded collection of elongated nanostructures, under essentially identical conditions. In some cases, the mechanical strength, thermal conductivity, electrical conductivity, and/or other properties (e.g., electromagnetic properties, specific heat, etc.) may be anisotropic.

The folded collection of elongated nanostructures within the composite article may serve to enhance one or more properties of the composite article. As specific examples, the nanostructures may be arranged to enhance the intralaminar interactions of components within a material or substrate, to enhance the interlaminar interactions of two substrates or layers within a composite structure, or to mechanically strengthen or otherwise enhance the binding between the two substrates, among other functions. For example, in some embodiments, a composite article described herein may exhibit a relatively large ultimate stress. For example, in one set of embodiments, a composite article (e.g., a composite article comprising the folded collection of elongated nanostructures) may have an ultimate strength in open hole compression of at least about 300 MPa, at least about 325 MPa, at least about 350 MPa, at least about 400 MPa or higher (e.g., in a direction substantially parallel to the wavelength of the folded collection of elongated nanostructures). In certain embodiments, the composite article may have an ultimate strength in open hole compression of up to about 500 MPa, or more. In some cases, an ultimate strength of a composite article may be at least about 2%, at least about 10%, at least about 25%, at least about 50%, at least about 100%, at least about 200%, at least about 500%, or at least about 1000% larger than the ultimate strength that would be exhibited by the support material absent the folded collection of elongated nanostructures, but under otherwise essentially identical conditions. In this context, essentially identical conditions means that the support material, temperature, dimensions, and other parameters of the structure and testing procedure would be substantially the same as the composite material, but the folded collection of elongated nanostructures would not be present. The ultimate tensile strength as described herein may be determined by open hole compression testing, using ASTM standard D6486M-14.

In some embodiments, a composite article described herein may exhibit a relatively large elastic modulus. In some cases, a composite article may exhibit a relatively large elastic modulus in a particular direction. For example, in some embodiments, the composite article exhibits a relatively large elastic modulus measured in a direction substantially parallel to the wavelength of the folded collection of elongated nanostructures (e.g., the direction indicated by arrow 430 in FIGS. 4B-4C) and/or measured in a direction substantially perpendicular to the wavelength of the folded collection of elongated nanostructures (e.g., the direction indicated by arrow 420 in FIGS. 4B-4C). A composite material comprising the collection of elongated nanostructures may have, according to certain but not necessarily all embodiments, improved mechanical properties (e.g., increased strength, increased strain to failure, increased toughness, increased elastic modulus) as compared to the support material alone in a direction substantially parallel to and/or a direction substantially perpendicular to the wavelength of the folded collection of elongated nanostructures. In certain embodiments comprising a collection of elongated nanostructures located at the interface between a first substrate and a second substrate, the collection may exhibit increased interlaminar reinforcement across the first and second substrates, as well as increased mechanical reinforcement in the transverse direction to the interface between the first and second substrates, as compared to the first and second substrates alone.

For example, in one set of embodiments, a composite article (e.g., a composite article comprising the folded collection of elongated nanostructures) may have an elastic modulus of at least about 100 MPa, at least about 500 MPa, at least about 1 GPa, at least about 5 GPa, at least about 7.5 GPa, at least about 10 GPa, at least about 100 GPa, or at least about 500 GPa, or higher, measured in a direction substantially parallel to the wavelength of the folded collection of elongated nanostructures. In some embodiments, the composite article may have an elastic modulus measured in a direction substantially parallel to the wavelength of the folded collection of elongated nanostructures of up to about 1000 GPa, or more. In one set of embodiments, the composite article may have an elastic modulus of at least about 100 MPa, at least about 500 MPa, at least about 1 GPa, at least about 5 GPa, at least about 7.5 GPa, at least about 10 GPa, at least about 100 GPa, or at least about 500 GPa, or higher, measured in a direction substantially perpendicular to the wavelength of the folded collection of elongated nanostructures. In some embodiments, the composite article may have an elastic modulus measured in a direction substantially perpendicular to the wavelength of the folded collection of elongated nanostructures of up to about 1000 GPa, or more. In some cases, an elastic modulus (in one or more directions) of a composite article may be at least about 2%, at least about 5%, 10%, at least about 25%, at least about 50%, at least about 100%, at least about 200%, at least about 500%, or at least about 1000% larger than the elastic modulus that would be exhibited by the support material absent the folded collection of elongated nanostructures, but under otherwise essentially identical conditions. In this context, essentially identical conditions means that the support material, temperature, dimensions, and other parameters of the structure and testing procedure would be substantially the same as the composite material, but the folded collection of elongated nanostructures would not be present. The elastic modulus, as described herein, can be determined using a nanoindenter (e.g., a Nanotest 600 nanomechanical testing system (Micro Materials, UK)) with a Berkovich-type indenter inside the nanoindenter's thermally insulated environmental chamber (25° C.±0.5° C., relative humidity 45%±2%) at a loading and unloading rate of 100 mN/s.

In some embodiments, a composite article described herein may exhibit a relatively large electrical conductivity. In some cases, a composite article may exhibit a relatively large electrical conductivity in a particular direction. For example, in some embodiments, the composite article exhibits a relatively large electrical conductivity measured in a direction substantially parallel to the wavelength of the folded collection of elongated nanostructures (e.g., the direction indicated by arrow 430 in FIGS. 4B-4C) and/or measured in a direction substantially perpendicular to the wavelength of the folded collection of elongated nanostructures (e.g., the direction indicated by arrow 420 in FIGS. 4B-4C). A composite material comprising the collection of elongated nanostructures may have, according to certain but not necessarily all embodiments, improved electrical properties (e.g., increased electrical conductivity) as compared to the support material alone in a direction substantially parallel to and/or a direction substantially perpendicular to the wavelength of the folded collection of elongated nanostructures. In some embodiments, a composite article (e.g., a composite article comprising a collection of folded elongated nanostructures) may have an electrical conductivity of at least about $10^{-4}$ S/m, $10^{-3}$ S/m, $10^{-2}$ S/m, 0.1 S/m, 1 S/m, 10 S/m, 100 S/m, $10^3$ S/m, $10^4$ S/m, or greater. In some cases, the electrical conductivity of a support material may be at least about 5 times, at least about 10 times, at least about 50 times, at least about 100 times, at least about 1000 times, at least about 10,000 times, at least about 100,000 times, at least about 1,000,000 times, at least about 10,000,000 times, or at least about 100,000,000 times larger than the electrical conductivity that would be exhibited by the support material absent the folded collection of elongated nanostructures, but under otherwise essentially identical conditions. In this context, essentially identical conditions means that the support material, temperature, dimensions, and other parameters of the structure and testing procedure would be substantially the same as the composite material, but the elongated nanostructures would not be present. Electrical conductivity, as described herein, may be determined using direct current impedance measurements.

Certain embodiments are directed to methods of forming articles, such as composite articles. Some embodiments comprise applying a force to a collection of elongated nanostructures located adjacent a support material. Referring again to FIG. 3A, collection 300a of elongated nanostructures may be located adjacent a support material at terminus 304. In certain embodiments, the collection of elongated nanostructures may be at least partially embedded in, or embedded within the bulk of, the support material. In some such embodiments, a first tensile or compressive force 320, a second tensile or compressive force 330, and/or one or more torsional moments 340 and 342 may be applied to the collection of elongated nanostructures and/or the support material such that the collection folds (e.g., folded collection 300b). In some such embodiments, the force is applied during a period of time in which the support material is softened.

According to certain embodiments, one or more folds in the collection of nanostructures may be formed after a force is applied and/or after the support material has been softened. For example, in certain embodiments, the collection of elongated nanostructures penetrate at least a first surface of the support material upon application of force to the collection (and/or support material) and/or softening of the support material. In some cases, the force may be applied over at least a portion of the time during which the support material is softened. In some embodiments, the collection of elongated structures may be located adjacent the support material and, upon application of one or more forces, the collection of elongated nanostructures penetrates at least a first surface of the support material and the collection folds (e.g., folded collection 405 in FIG. 4B). In certain embodiments, one or more folds may be formed during at least a portion of the time in which the force is applied and/or the support material is softened. In some embodiments, after at least a portion of the time over which the force is applied, the collection of nanostructures comprise a first fold and a second fold. In certain embodiments, after at least a portion of the softening, the collection of nanostructures comprise a first fold and a second fold. In certain embodiments, the collection of elongated nanostructures is essentially free of folds prior to the application of force and/or softening of the support material.

Softening of the support material generally refers to exposing the support material to conditions under which it is mechanically less stiff (e.g., softer) than its equilibrium state at 25° C. and 1 atm. In some embodiments, softening the support material comprises heating the support material to soften it. In certain embodiments, softening the support material comprises exposing the support material to a solvent such that it softens. Non-limiting examples of suitable support material include polymers (e.g., polyether ether ketone (PEEK), polyetherketoneketone (PEKK), thermosetting polymers such as epoxy), polymeric precursors to other materials (e.g., phenolic for carbon (pyrolyzed)), and sol-gels.

In some embodiments, applying one or more forces to the collection of elongated nanostructures and/or support material comprises positioning the support material over the collection of nanostructures, and allowing the support material to exert at least a gravitational force on the collection. That is to say, is certain embodiments, at least the weight of the support material is applied to the collection of nanostructures. In some embodiments, applying one or more forces comprises applying a pressure (e.g., positive pressure, vacuum) to the collection of elongated nanostructures and/or support material. In some embodiments, the pressure may be at least about 0.1 psi, at least about 0.5 psi, at least about 1 psi, at least about 2 psi, at least about 5 psi, at least about 10 psi, at least about 20 psi, or at least about 50 psi. In certain embodiments, the pressure may be less than or equal to about 100 psi, less than or equal to about 50 psi, less than or equal to about 20 psi, less than or equal to about 10 psi, less than or equal to about 5 psi, less than or equal to about 2 psi, less than or equal to about 1 psi, or less than or equal to about 0.5 psi. Combinations of the above referenced ranges are also possible (e.g., at least about 0.1 psi and less than or equal to about 100 psi). Other ranges are also possible.

In certain embodiments, the collection of elongated nanostructures may be positioned between a first substrate and a second substrate, and one or more forces may be applied to the two substrates such that the collection of elongated nanostructures fold at the interface between the first substrate and the second substrate. In some cases, the first substrate and/or the second substrate may be softened, as described herein. In an exemplary embodiment, a collection of elongated nanostructures may be positioned between two prepreg substrates and heated (e.g., in an autoclave) and/or exposed to vacuum (e.g., in the autoclave) such that the collection of elongated nanostructures folds at the interface between the first substrate and the second substrate, and becomes at least partially imbedded in the first and/or second substrates. Prepreg substrates are described in more detail, below.

Figure 5A:
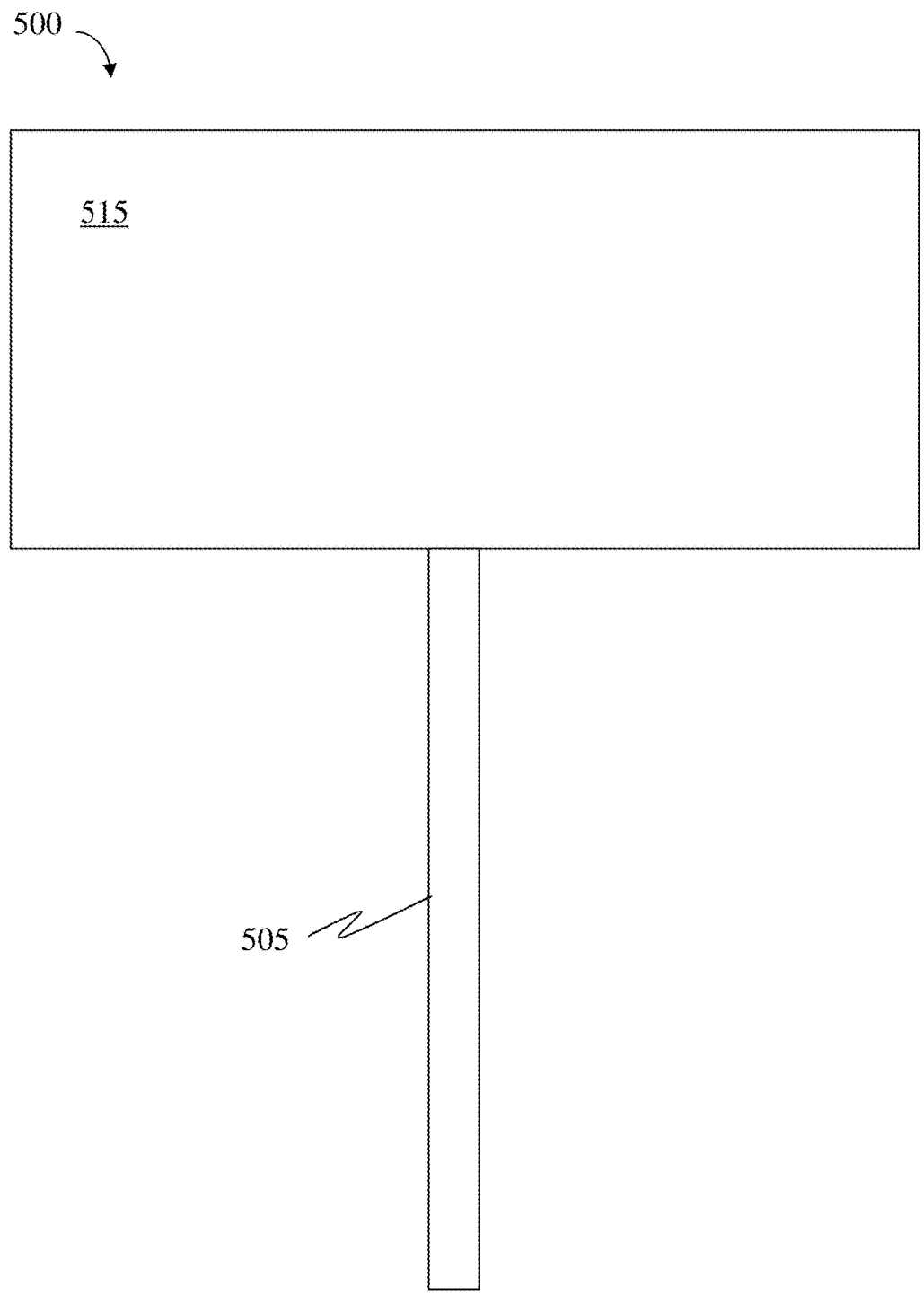
FIG. 5A is a schematic diagram of a method for forming a folded collection of elongated nanostructures in a support material, according to one set of embodiments.
Figure 5B:
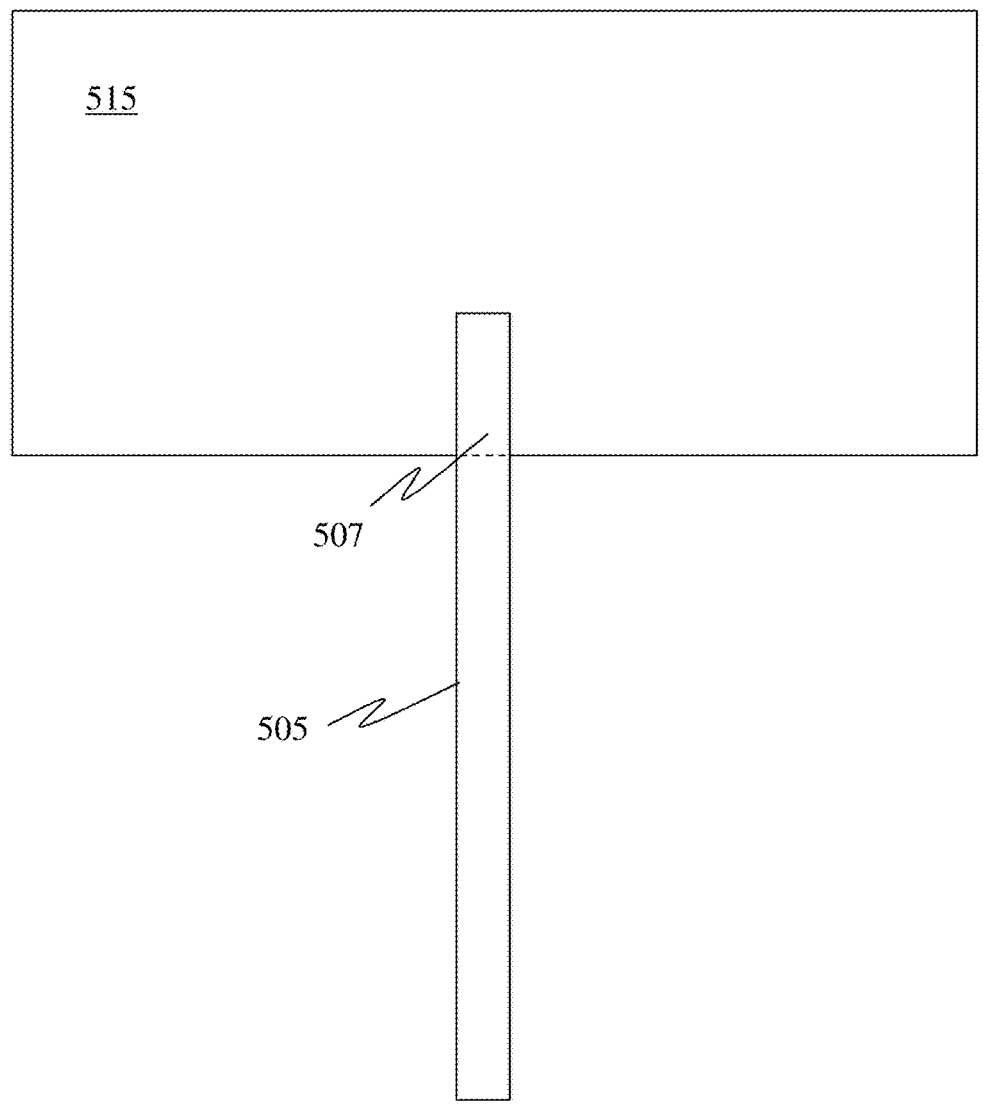
FIG. 5B is a schematic diagram of a method for forming a folded collection of elongated nanostructures in a support material, according to one set of embodiments.
Figure 5C:
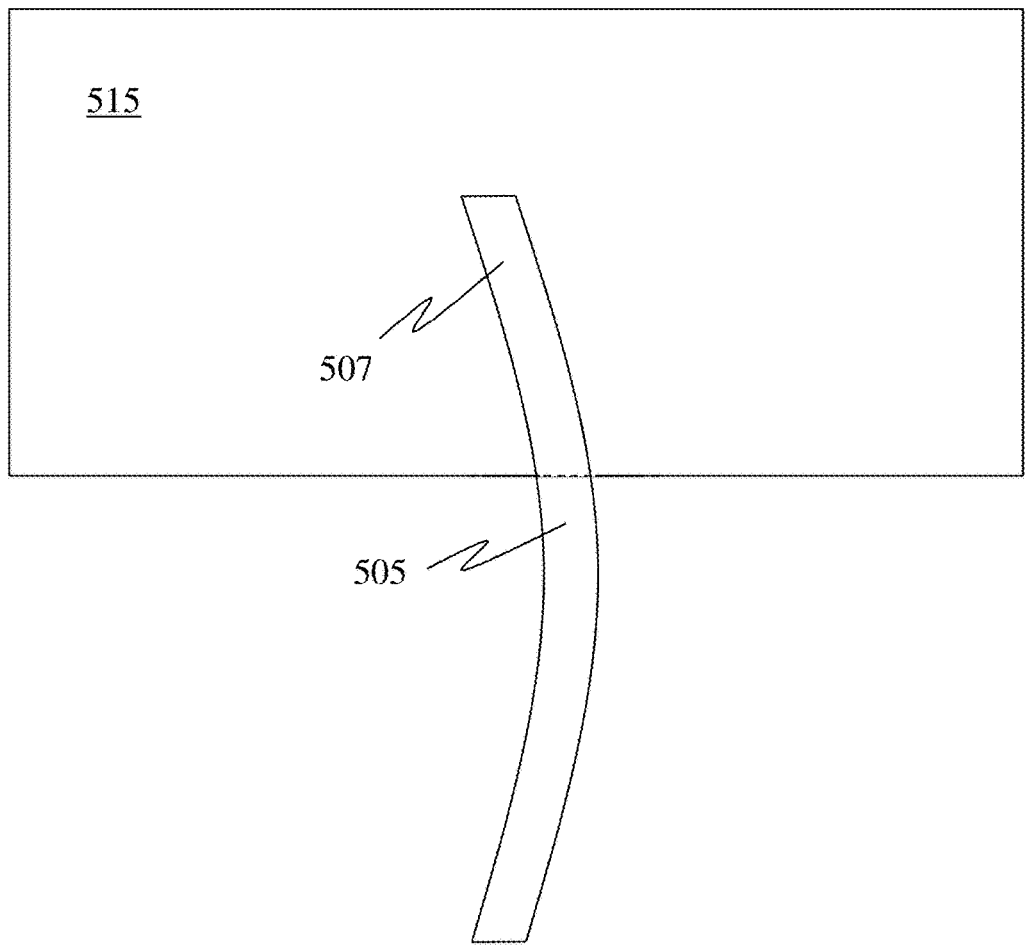
FIG. 5C is a schematic diagram of a method for forming a folded collection of elongated nanostructures in a support material, according to one set of embodiments.
Figure 5D:
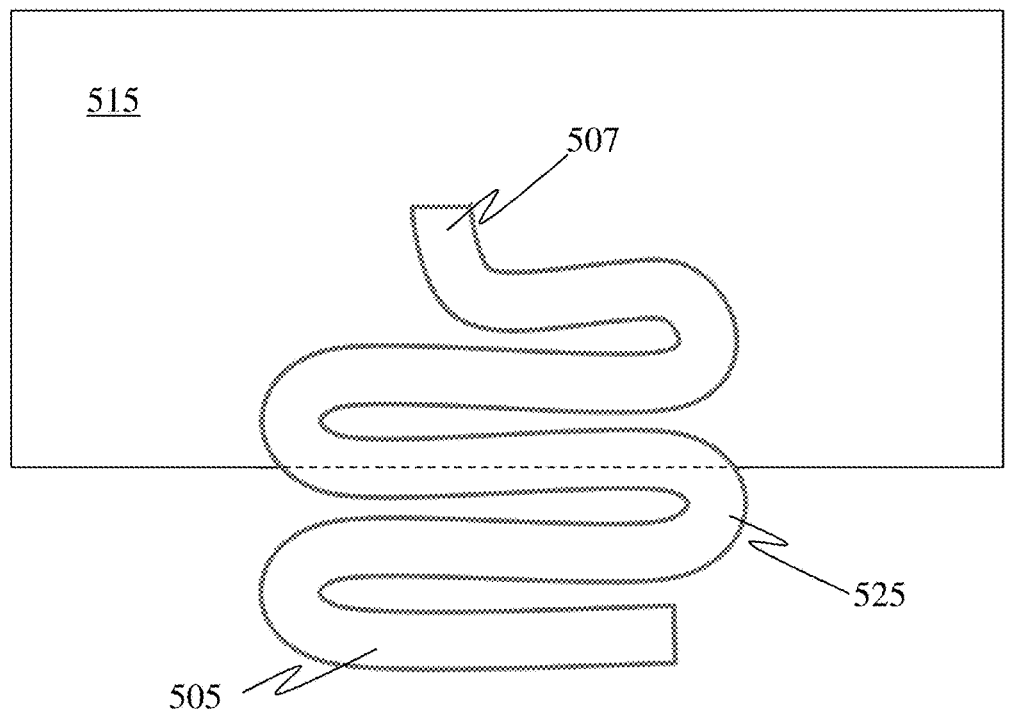
FIG. 5D is a schematic diagram of a method for forming a folded collection of elongated nanostructures in a support material, according to one set of embodiments.

In an exemplary embodiment, as shown in article 500 of FIG. 5A, first substrate 515 may be positioned above, and in contact with, a collection 505 of elongated nanostructures. As shown in FIG. 5B, first substrate 515 may be softened (e.g., heated) such that at least a portion of collection 505 of elongated nanostructures (e.g., portion 507) is embedded within first substrate 515. In some embodiments, the weight of the first substrate may apply a force on the collection of elongated nanostructures such that the collection buckles. In certain embodiments, an external force may be applied to the first substrate such that the collection buckles. For example, as shown in FIG. 5C, first substrate 515 has been softened such that at least a portion 507 of collection 505 of elongated nanostructures is embedded within first substrate 515, and the weight of first substrate 515 causes collection 505 of elongation nanostructures to buckle. In some embodiments, as illustrated in FIG. 5D, as gravitational forces act upon first substrate 515, the buckling of collection 505 of elongated nanostructures causes the formation of one or more folds (e.g., a fold formed comprising crest 525). In some embodiments, at least a portion of the folded collection of elongated nanostructures may be embedded within the first substrate. In certain embodiments, the folded collection of elongated nanostructures is substantially embedded within the first substrate.

Figure 6A:
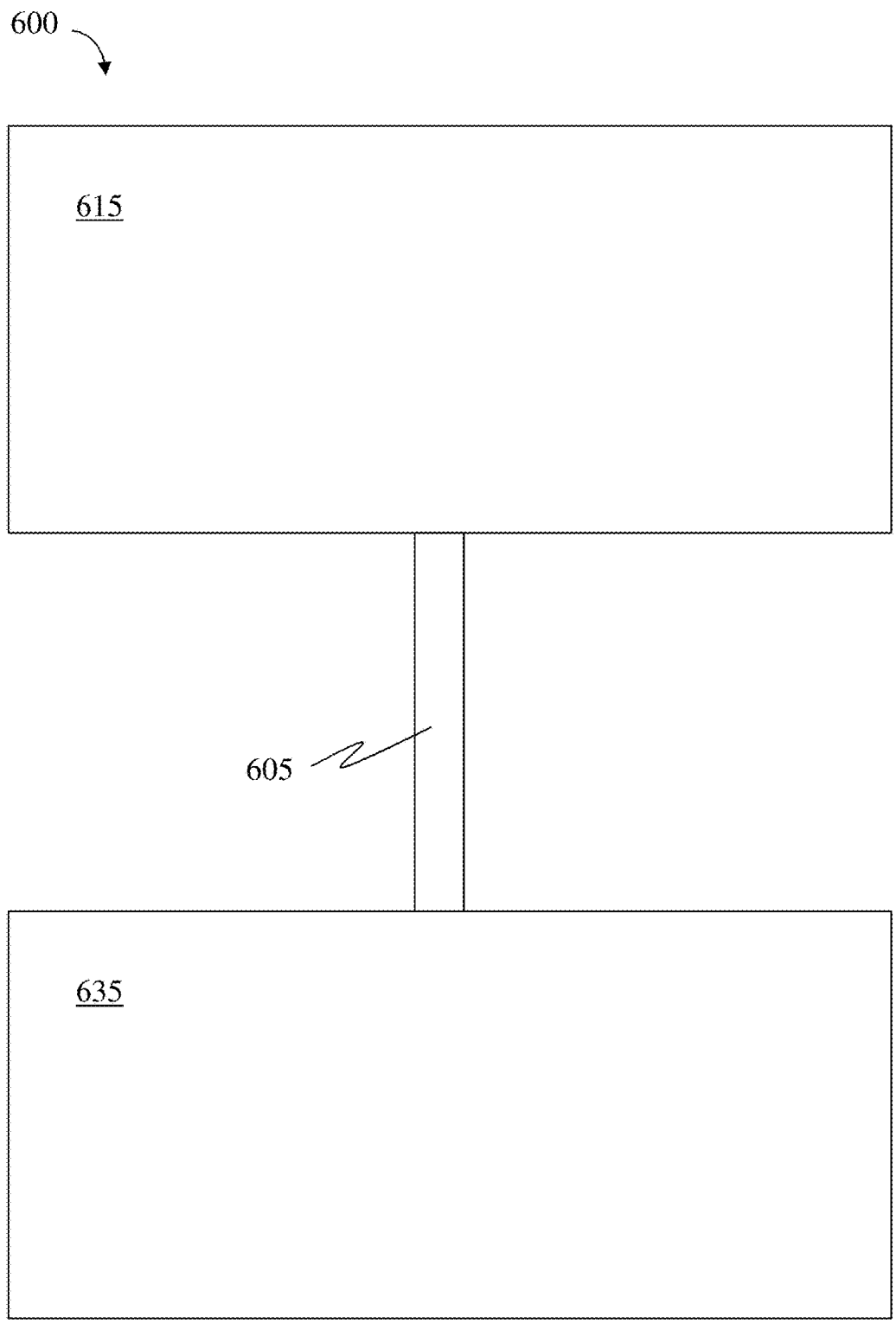
FIG. 6A is a schematic diagram of a method for forming a folded collection of elongated nanostructures in a support material, according to one set of embodiments.
Figure 6B:
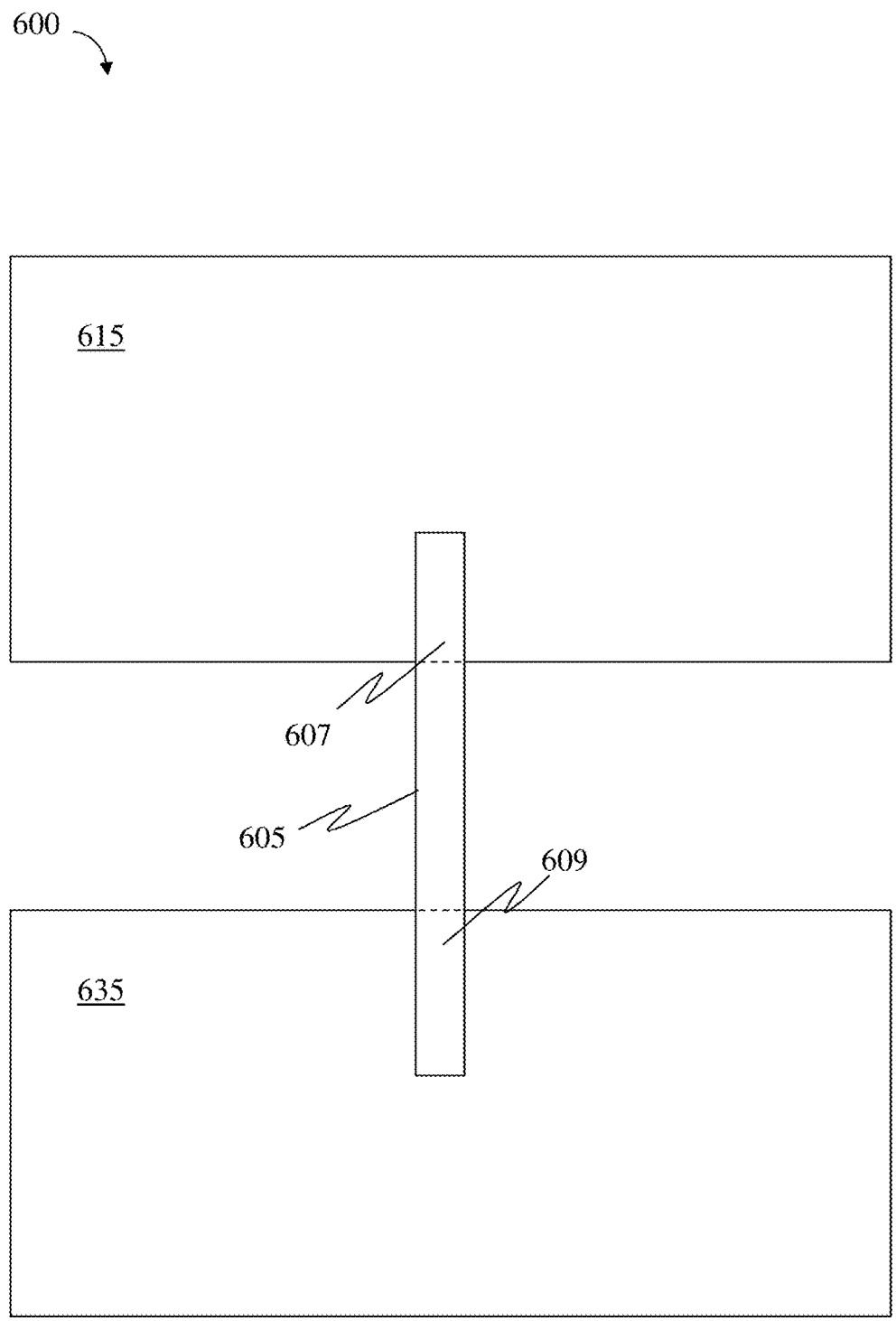
FIG. 6B is a schematic diagram of a method for forming a folded collection of elongated nanostructures in a support material, according to one set of embodiments.
Figure 6C:
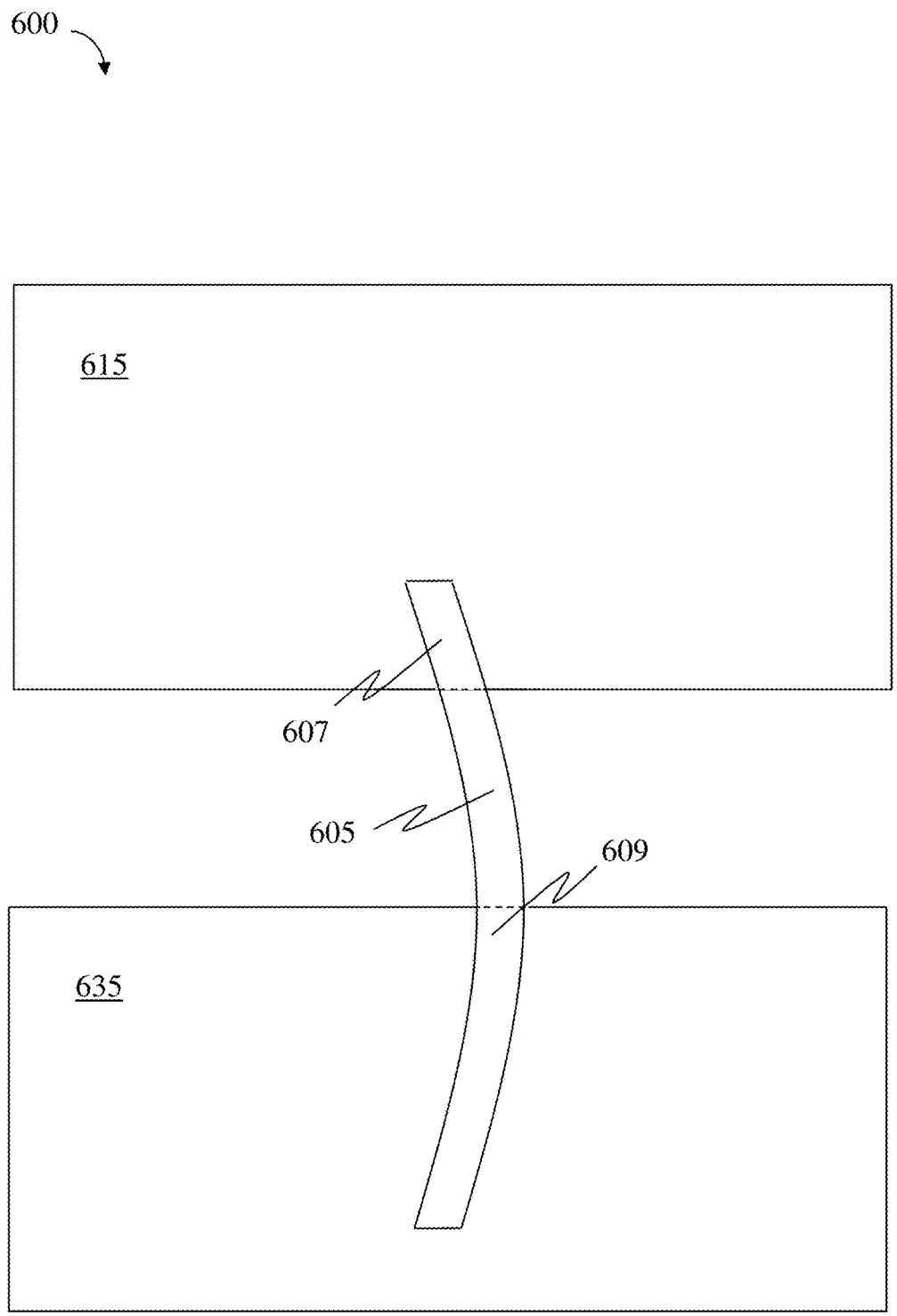
FIG. 6C is a schematic diagram of a method for forming a folded collection of elongated nanostructures in a support material, according to one set of embodiments.
Figure 6D:
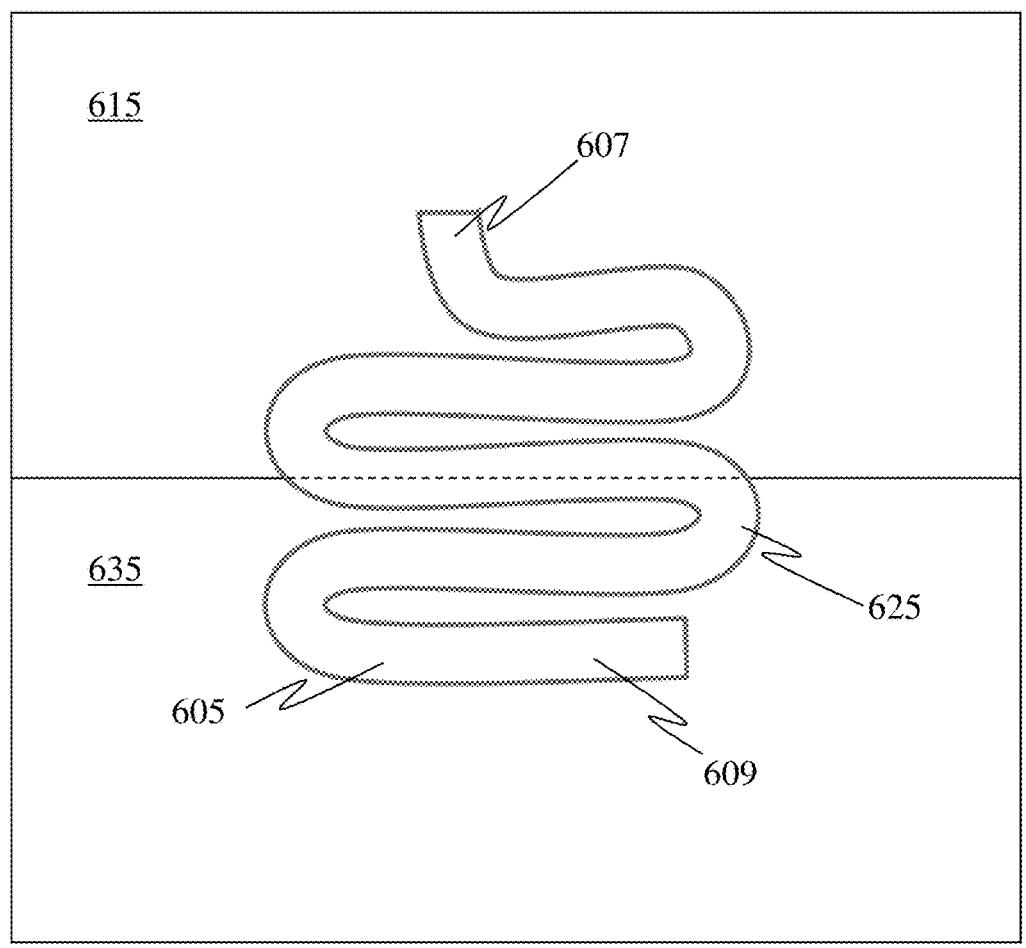
FIG. 6D is a schematic diagram of a method for forming a folded collection of elongated nanostructures in a support material, according to one set of embodiments.

In another exemplary embodiment, as shown in article 600 of FIG. 6A, first substrate 615 may be positioned above, and in contact with, a collection 605 of elongated nanostructures and second substrate 635 may be positioned below, and in contact with, collection 605 of nanostructures. As shown in FIG. 6B, first substrate 615 and/or second substrate 635 may be softened (e.g., heated) such that at least a portion of collection 605 of elongated nanostructures (e.g., portion 607) is embedded within first substrate 615 and/or at least a portion of collection 605 of elongated nanostructures (e.g., portion 609) is embedded within second substrate 635. In some embodiments, the weight of the first substrate may apply a force on the collection of elongated nanostructures such that the collection buckles. In certain embodiments, an external force and/or pressure may be applied to the first substrate such that the collection buckles. For example, as shown in FIG. 6C, first substrate 615 has been softened such that at least a portion 607 of collection 605 of elongated nanostructures is embedded within first substrate 615, and the weight of first substrate 615 causes collection 605 of elongation nanostructures to buckle. In some embodiments, weight of first substrate 615 may cause at least a portion 609 of collection of elongated nanostructures 609 to become embedded within second substrate 635. In some embodiments, as illustrated in FIG. 6D, as gravitational forces act upon first substrate 615, the buckling of collection 605 of elongated nanostructures causes the formation of one or more folds (e.g., a fold formed comprising crest 625). In some embodiments, at least a first portion of the folded collection of elongated nanostructures may be embedded within the first substrate and at least a second portion of the folded collection of elongated nanostructures may be embedded within the second substrate. For example, in some embodiments, as illustrated in FIG. 6D, portion 607 of folded collection 605 of elongated nanostructures is embedded within first substrate 615, and portion 609 of folded collection 605 of elongated nanostructures is embedded within second substrate 635. In some such embodiments, first substrate 615 and second substrate 635 may be in direct contact after the collection of elongated nanostructures fold.

The forces/pressures described herein may be applied using any method known in the art. In some embodiments, as described above, the forces/pressures described herein result from gravitational forces acting on a support material (e.g., comprising one or more substrates) in contact with the collection of elongated nanostructures. In some embodiments, a mechanical tool is used to apply the force to the collection of elongated nanostructures and/or support material. For example, an operator may apply a flat surface of a tool (e.g., a plastic plunger) against the side of a collection of elongated nanostructures and/or support material, and compress the nanostructures/support material by hand. In some embodiments, the force may be applied using compression springs. For example, the collection of elongated nanostructures and/or support material may be situated in an enclosed or semi-enclosed containment structure with one or more compression springs situated between the side of the collection of elongated nanostructures and an adjacent wall of the containment structure. Forces may be applied using other elements including, but not limited to, weights, machine screws, and/or pneumatic devices, among others. For example, in one set of embodiments, a collection of elongated nanostructures and/or support material is arranged between two plates. A device (e.g., a machine screw, a spring, etc.) may be used to apply pressure against the sides of the elongated nanostructures and/or support material via the plates. In the case of a machine screw, for example, the elongated nanostructures and/or support material may be compressed between the plates upon rotating the screw. In still other embodiments, a liquid may be applied to the collection of elongated nanostructures and/or support material and dried; upon drying, capillary forces may pull the elongated nanostructures together, resulting in the formation of one or more folds. Other methods of applying forces to the collection of elongated nanostructures and/or support material can be envisioned by one of ordinary skill in the art. For example, the applied force does not need to be applied by a machine or human, but can also be applied via gravity (e.g., gravitational forces acting upon the support material), as described above.

As described herein, certain embodiments comprise use or addition of one or more support materials. The support materials may provide mechanical, chemical, or otherwise stabilizing support for the plurality of nanostructures. In some cases, the support material may be a monomer, a polymer, a fiber, a ceramic, or a metal, and may be further processed to support the nanostructures. For example, a mixture of monomeric species may be added to the elongated nanostructures, and subsequent polymerization of the monomeric species may produce a polymer matrix comprising the elongated nanostructures disposed therein. As another example, a solgel can be applied to a collection of elongated nanostructures and processed to form a ceramic material between the elongated nanostructures. In some embodiments, gas phase infiltration can be used to form carbonaceous material or silicon carbide between the elongated nanostructures. Gas-phase infiltration may be executed by various processes such as chemical vapor deposition including decomposition of hydrocarbons. Examples of suitable support materials are described in detail below.

The support material may be a polymer material (e.g., an organic polymer material), a metal material, a ceramic material, or combinations thereof. Polymer materials for use as binding materials and/or support materials, as described herein, may be any material compatible with elongated nanostructures. For example, the polymer material may be selected to uniformly "wet" the elongated nanostructures and/or to bind one or more substrates. In some cases, the polymer material may be selected to have a particular viscosity, such as 50,000 cPs or lower; 10,000 cPs or lower; 5,000 cPs or lower; 1,000 cPs or lower; 500 cPs or lower; 250 cPs or lower; or 100 cPs or lower. In some embodiments, the polymer material may be selected to have a viscosity between 150-250 cPs. In some cases, the support material may comprise a thermoset or thermoplastic. Non-limiting examples of thermosets include Microchem SU-8 (UV curing epoxy, grades from 2000.1 to 2100, and viscosities ranging from 3 cPs to 10,000 cPs), Buehler Epothin (low viscosity, about 150 cPs, room temperature curing epoxy), West Systems 206+109 Hardener (low viscosity, ~200 cPs, room temperature curing epoxy), Loctite Hysol 1C (20-min curing conductive epoxy, viscosity 200,000-500,000 cPs), Hexcel RTM6 (resin transfer molding epoxy, viscosity during process ~10 cPs), Hexcel HexFlow VRM 34 (structural VARTM or vacuum assisted resin transfer molding epoxy, viscosity during process ~500 cPs). Non-limiting examples of thermoplastics include polystyrene, or Microchem PMMA (UV curing thermoplastic, grades ranging from 10 cPs to ~1,000 cPs). In one embodiment, the polymer support material may be PMMA, EpoThin, West-Systems EPON, M21 resin, Cycom 5320, 8552 resin, RTM6, VRM34, 977-3, SU8, or Hysol1C.

The support material (or a precursor thereof) may be transported between the elongated nanostructures via any method known to those of ordinary skill in the art. In some embodiments, the support material may be transported between the elongated nanostructures via capillary forces. In other embodiments, the support material or precursor thereof may be transported between the elongated nanostructures by pressure driven flow, molding, or any other known technique.

The support material may be hardened using any suitable method. In some embodiments in which epoxy is used as a support material, the epoxy may be cured, for example, by allowing the precursor material to set, or optionally by applying heat. In some embodiments, hardening may comprise the polymerization of the support material precursor. In some embodiments, hardening the support material may comprise cooling the support material such that it changes phase from a liquid to a solid (i.e., "freezes") or becomes less compliant.

As used herein, the term "elongated nanostructure" refers to a structure having a cross-sectional dimension of less than or equal to about 100 nanometers and a length resulting in an aspect ratio greater than or equal to about 10. In some embodiments, the elongated nanostructure can have an aspect ratio greater than or equal to about 100, greater than or equal to about 1000, greater than or equal to about 10,000, or greater. Those skilled in the art would understand that for elongated structures which are not straight, the aspect ratio is measured along the longitudinal axis of the elongated nanostructure.

Elongated nanostructures can be single molecules (e.g., in the case of some nanotubes) or can include multiple molecules bound to each other (e.g., in the case of some nanofibers). In some cases, the elongated nanostructure may have a maximum cross-sectional dimension of less than about 100 nanometers, less than about 50 nanometers, less than about 25 nanometers, less than about 10 nanometers, or, in some cases, less than about 1 nanometer. A "maximum cross-sectional dimension" of an elongated nanostructure, as used herein, refers to the largest dimension between two points on opposed outer boundaries of the elongated nanostructure, as measured perpendicular to the length of the elongated nanostructure (e.g., the length of a carbon nanotube). The "average of the maximum cross-sectional dimensions" of a plurality of structures refers to the number average. The elongated nanostructure can have a cylindrical or pseudo-cylindrical shape, in some embodiments. In some embodiments, the elongated nanostructure can be a nanotube, such as a carbon nanotube. Other examples of elongated nanostructures include, but are not limited to, nanofibers and nanowires.

As used herein, the term "elongated carbon-based nanostructure" is an elongated nanostructure having a fused network of aromatic rings and containing at least about 30% carbon by mass. In some embodiments, the elongated carbon-based nanostructures may comprise at least about 40%, at least about 50%, at least about 60%, at least about 70%, at least about 80%, at least about 90%, or at least about 95% of carbon by mass, or more. In some embodiments, the elongated carbon-based nanostructures comprise 100% carbon, by mass. The elongated carbon-based nanostructure may include, in some embodiments, a fused network of at least 10, at least 100, at least 1000, at least $10^5$, at least $10^6$, at least $10^7$, or at least $10^8$ aromatic rings (or more). The term "fused network" would not include, for example, a biphenyl group, wherein two phenyl rings are joined by a single bond and are not fused. Non-limiting examples of elongated carbon-based nanostructures include carbon nanotubes (e.g., single-walled carbon nanotubes, double-walled carbon nanotubes, multi-walled carbon nanotubes, etc.), carbon nanowires, carbon nanofibers, and the like.

The elongated nanostructures may also be formed of other materials, in some embodiments. For example, the elongated nanostructure may be formed of one or more inorganic materials. Non-limiting examples include semiconductor nanowires such as silicon (Si) nanowires, indium-gallium-arsenide (InGaAs) nanowires, and nanotubes comprising boron nitride (BN), silicon nitride ($Si_3N_4$), silicon carbide (SiC), dichalcogenides such as (WS$_2$), oxides such as titanium dioxide (TiO$_2$) and molybdenum trioxide (MoO$_3$), and boron-carbon-nitrogen compositions such as BC$_2$N$_2$ and BC$_4$N.

As used herein, the term "nanotube" refers to a substantially cylindrical elongated nanostructure comprising a fused network of primarily six-membered rings (e.g., six-membered aromatic rings). Nanotubes may include, in some embodiments, a fused network of at least 10, at least 100, at least 1000, at least $10^5$, at least $10^6$, at least $10^7$, or at least $10^8$ rings (e.g., six-membered rings such as six-membered aromatic rings), or more. In some cases, nanotubes may resemble a sheet of graphite formed into a seamless cylindrical structure. It should be understood that the nanotube may also comprise rings or lattice structures other than six-membered rings. According to certain embodiments, at least one end of the nanotube may be capped, i.e., with a curved or nonplanar aromatic group.

The elongated nanostructure can be a carbon nanotube, in some embodiments. The term "carbon nanotube" refers to nanotubes comprising primarily carbon atoms and includes single-walled nanotubes (SWNTs), double-walled CNTs (DWNTs), multi-walled nanotubes (MWNTs) (e.g., concentric carbon nanotubes), inorganic derivatives thereof, and the like. In some embodiments, the carbon nanotube may comprise at least about 40%, at least about 50%, at least about 60%, at least about 70%, at least about 80%, at least about 90%, or at least about 95% of carbon by mass, or more. In some embodiments, the carbon nanotube comprises 100% carbon, by mass. The carbon nanotube may include, in some embodiments, a fused network of at least 10, at least 100, at least 1000, at least $10^5$, at least $10^6$, at least $10^7$, or at least $10^8$ aromatic rings (or more). In some embodiments, the carbon nanotube is a single-walled carbon nanotube. In some cases, the carbon nanotube is a multi-walled carbon nanotube (e.g., a double-walled carbon nanotube).

The "longitudinal axis" of an article corresponds to the imaginary line that connects the geometric centers of the cross-sections of the article as a pathway is traced, along the longest length of the article, from one end to another. For example, referring to FIG. 1A, the longitudinal axis of nanostructure 110 is illustrated as dotted line 120. Referring to FIG. 2A, the longitudinal axis of folded nanostructure 230 is illustrated as dotted line 242. Referring to FIG. 3A, the longitudinal axis of collection 300a of elongated nanostructures is illustrated as dotted line 325. Referring to FIG. 3C, the longitudinal axis of folded collection 300b of elongated nanostructures is illustrated as dotted line 370.

In some embodiments, the support material may be part of one or more prepreg substrates. For example, referring again to FIG. 4C, first substrate 415 may be a first prepreg substrate (e.g., comprising a first prepreg material) and second substrate 417 may be a second prepreg substrate (e.g., comprising a second prepreg material). The first prepreg material may be the same or different as the second prepreg material. As used herein, the term "prepreg" refers to one or more layers of thermoset or thermoplastic resin containing embedded fibers, for example fibers of carbon, glass, silicon carbide, and the like. In some embodiments, thermoset materials include epoxy, rubber strengthened epoxy, BMI, PMK-15, polyesters, vinylesters, and the like, and preferred thermoplastic materials include polyamides, polyimides, polyarylene sulfide, polyetherimide, polyesterimides, polyarylenes, polysulfones, polyethersulfones, polyphenylene sulfide, polyetherimide, polypropylene, polyolefins, polyketones, polyetherketones, polyetherketoneketone, polyetheretherketones, polyester, and analogs and mixtures thereof. Typically, the prepreg includes fibers that are aligned and/or interlaced (woven or braided) and the prepregs are arranged such the fibers of many layers are not aligned with fibers of other layers, the arrangement being dictated by directional stiffness requirements of the article to be formed by the method. The fibers generally cannot be stretched appreciably longitudinally, thus each layer cannot be stretched appreciably in the direction along which its fibers are arranged. Exemplary prepregs include thin-ply prepregs, non-crimp fabric prepregs, TORLON thermoplastic laminate, PEEK (polyether etherketone, Imperial Chemical Industries, PLC, England), PEKK (polyetherketone ketone, DuPont) thermoplastic, T800H/3900 2 thermoset from Toray (Japan), AS4/8552 from Hexcel (Magna, Utah), IMA from Hexcel (Magna, Utah), IM7/M21 from Hexcel (Magna, Utah), IM7/977-3 from Hexcel (Magna, Utah), Cycom 5320-1 from Cytec (Woodland Park. N.J.), and AS4/3501 6 thermoset from Hexcel (Magna, Utah).

U.S. Provisional Application No. 62/343,604, filed May 31, 2016, and entitled "Composite Articles Comprising Non-Linear Elongated Nanostructures and Associated Methods" is incorporated herein by reference in its entirety for all purposes.

EXAMPLES

The following examples illustrate embodiments of certain aspects of the invention.

Example 1

The following example demonstrates the performance of composites comprising a folded collection of elongated nanostructures and a support material.

Open hole compression testing of quasi-isotropic aerospace-grade prepreg (Hexcel AS4/8552) laminates comprising folded elongated nanostructures, unfolded elongated nanostructures, and no nanostructures in open hole compression (OHC) was conducted.

For the OHC testing herein, a 6.0-6.48 mm diameter central hole was precision machined in 220±2 mm×24.0±0.5 mm specimens. In the case of the A-CNT specimens, 30 mm×24 mm wide A-CNTs forests were placed at all interfaces centered on the hole. Following the ASTM D6484-14 Testing Standard, samples were supported against buckling between two 125 mm flat platens containing a center 20 mm diameter center holes and loaded in compression at 0.025 mm/s. Specimens were clamped with a gage length of 130 mm.

Aligned CNTs, sometimes termed forests, were grown in a tube furnace (Lindberg/Blue M) by chemical vapor deposition (CVD) at atmospheric pressure following procedures previously documented. Si wafer pieces (30 cm×40 cm) coated with catalyst (1/10 nm of Fe/Al$_2$O$_3$) by e-beam evaporation were placed in the quartz tube (44 mm inner diameter) reactor and pretreated at 650° C. during 7 minutes at reducing atmosphere (H$_2$/He) to condition the catalyst. A reactant mixture (H$_2$/He/C$_2$H$_4$) is introduced for 30 seconds to produce ~20 μm high A-CNTs. In order to facilitate the transfer of the forest, a reduction cycle is applied, reducing the attachment between the CNTs and the Si substrate. The A-CNT forests were found to have an areal density of ~1 vol % corresponding to $10^9$-$10^{10}$ CNTs per cm$^2$, with each CNT comprised of 3-5 walls and having an outer diameter of ~8 nm, giving an inter-CNT spacing of ~80 nm. The A-CNT forests were nominally 20 μm in length with non-trivial variability (~±10 μm) in height with extremes of 3 and 30 μm noted.

The A-CNT forests were introduced to the interlaminar region by manually transferring them to the surface of the composite prepreg plies. A unidirectional aerospace-grade carbon fiber and epoxy prepreg tape (Hexcel AS4/8552) was used. The prepreg material was designed to give 63.5% carbon fiber by volume and a nominal cured ply thickness of 0.130 mm in the cured laminate. The Si wafers were positioned with the CNT side in contact with the prepreg surface and moderate vacuum and heat (~1 bar and ~60) was applied on each individual prepreg ply by using a vacuum bag and heating blanket assembly. Once the A-CNTs had attached to the tacky prepreg surface of a ply, the Si wafers were manually released from the attached CNT forests and the lay-up of the next ply continued until the lay-up was completed. Effectiveness of the transfer process was between ~75-90% of ply surface area. A standard 16-ply $[(0/90/\pm45)_2]_s$ quasi-isotropic laminate with 15 nano-stitched interfaces was created. The laminates were assembled with cure materials and cured in an autoclave following the industry process specifications (6 bar of total pressure at 1.5° C./min to 180° C., hold for 2 h, cool at 3° C./min to 60° C. and vent pressure, let cool to room temperature). Baseline and A-CNT specimens were cured in the same laminate. Once the laminates (210×300 mm² in-plane dimensions) were cured, sample edges were cut to size and prepared for their different tests. Specimen dimensions and test specifics are provided below for the different types of testing. All of the samples, baseline and nano-stitched specimens, had measured thickness within 1 standard deviation of the nominal 2.080 mm laminate thickness.

A compressive pressure of ~1 atm was used to buckled the A-CNTs prior to prepreg curing to get folded

TABLE 1

| | Strength (in MPa) Without Nanostructures | Strength (in MPa) With Nanostructures | |
|---|---|---|---|
| Unfolded Collection of Nanostructures | 270 | 299 | +11% |
| Folded Collection of Nanostructures | 292 | 333 | +14% |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed.

The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
 a collection of elongated nanostructures arranged within a support material,
 wherein the collection has a longitudinal axis that defines a plurality of crests and a plurality of troughs defining at least one amplitude and at least one wavelength, wherein the ratio of the amplitude to the wavelength is at least about 0.5:1; and
 the elongated nanostructures are substantially locally aligned.

2. An article as in claim 1, wherein the collection has an average amplitude of at least about 5 microns.

3. An article as in claim 1, wherein the collection has an average wavelength of at least about 0.5 microns.

4. An article, comprising:
 a collection of substantially locally aligned elongated nanostructures; and
 a support material within which the collection of elongated nanostructures are arranged,
 wherein the collection of elongated nanostructures defines a first geometric surface portion of the collection and a second geometric surface portion of the collection opposite the first geometric surface portion;
 wherein the collection of elongated nanostructures comprises a first fold comprising at least a first portion of the first geometric surface portion facing at least a second portion of the first geometric surface portion, and a second fold comprising at least a first portion of the second geometric surface portion facing at least a second portion of the second geometric surface portion; and
 wherein the support material comprises a first substrate and a second substrate located relative to the first substrate such that an interface is formed between the first substrate and the second substrate.

5. An article as in claim 4, wherein the collection of elongated nanostructures is located at the interface between the first substrate and the second substrate.

6. An article, comprising:
 a collection of substantially locally aligned elongated nanostructures; and
 a support material within which the collection of elongated nanostructures are arranged,
 wherein the collection of elongated nanostructures defines a first geometric surface portion of the collection and a second geometric surface portion of the collection opposite the first geometric surface portion;
 wherein the collection of elongated nanostructures comprises a first fold comprising at least a first portion of the first geometric surface portion facing at least a second portion of the first geometric surface portion, and a second fold comprising at least a first portion of the second geometric surface portion facing at least a second portion of the second geometric surface portion; and
 wherein the first geometric surface portion has an aspect ratio of at least 10:1.

7. An article as in claim 6, wherein the first portion of the first geometric surface portion and the second portion of the first geometric surface portion are aligned within 10 degrees of parallel.

8. An article as in claim 6, wherein the nanostructures are nanotubes.

9. An article as in claim 8, wherein the nanotubes are carbon nanotubes.

10. An article as in claim 6, wherein the nanostructures are nanowires.

11. An article as in claim 6, wherein at least a portion of the elongated nanostructures extend a distance at least 10 times greater than the number average of nearest neighbor distances within the collection in each of two orthogonal directions each perpendicular to the longitudinal axes of the nanostructures.

12. An article as in claim 6, wherein the support material comprises a polymer, a metal, and/or a ceramic.

* * * * *